(12) United States Patent
Fang et al.

(10) Patent No.: US 12,530,827 B2
(45) Date of Patent: Jan. 20, 2026

(54) SYSTEMS AND METHODS FOR PREDICTING PERFUSION IMAGES FROM NON-CONTRAST SCANS

(71) Applicant: University of Florida Research Foundation, Inc., Gainesville, FL (US)

(72) Inventors: Ruogu Fang, Gainesville, FL (US); Garrett Carlton Fullerton, Gainesville, FL (US); Simon Kato, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 240 days.

(21) Appl. No.: 18/230,835

(22) Filed: Aug. 7, 2023

(65) Prior Publication Data
US 2024/0041417 A1    Feb. 8, 2024

Related U.S. Application Data

(60) Provisional application No. 63/395,561, filed on Aug. 5, 2022.

(51) Int. Cl.
*G06T 11/00*    (2006.01)
*A61B 6/03*    (2006.01)
(Continued)

(52) U.S. Cl.
CPC ............ *G06T 11/008* (2013.01); *A61B 6/032* (2013.01); *A61B 6/501* (2013.01); *A61B 6/507* (2013.01);
(Continued)

(58) Field of Classification Search
None
See application file for complete search history.

(56) References Cited

U.S. PATENT DOCUMENTS 9,324,143 B2 * 4/2016 Goyal ................... G06T 7/0012
11,523,789 B2 * 12/2022 Li ......................... A61B 6/5205
(Continued)

OTHER PUBLICATIONS

Cui, Liyuan, et al. "Deep learning in ischemic stroke imaging analysis: a comprehensive review", BioMed Research International, vol. 2022, Article ID 2456550, 15 pages (Year: 2022).*
(Continued)

*Primary Examiner* — Scott A Rogers
(74) *Attorney, Agent, or Firm* — Thomas | Horstemeyer, LLP

(57) ABSTRACT

Various examples are provided related to predicting perfusion images from non-contrast scans. In one example, a method for predicting perfusion images includes generating perfusion maps of an organ of a subject from non-contrast computed tomography (NCCT) slices of the organ; processing the perfusion maps based upon weights determined by a Physicians-in-the-Loop (PILO) module; and generating synthetic computed tomography perfusion (CTP) maps from the processed perfusion maps, the synthetic CTP maps generated by deep learning-based multimodal image translation. In another example, a system includes at least one computing device that can generate prefusion maps of an organ from NCCT slices; process the perfusion maps based upon weights determined by a PILO module; and generate synthetic CTP maps from the processed perfusion maps using deep learning-based multimodal image translation. The CTP maps can be rendered for display to a user.

17 Claims, 17 Drawing Sheets

(51) Int. Cl.
  *A61B 6/50* (2024.01)
  *G06T 7/00* (2017.01)
  *A61B 6/46* (2024.01)

(52) U.S. Cl.
  CPC ............ *G06T 7/0012* (2013.01); *A61B 6/461* (2013.01); *G06T 2207/10081* (2013.01); *G06T 2207/20081* (2013.01); *G06T 2207/30016* (2013.01); *G06T 2207/30104* (2013.01); *G06T 2211/464* (2023.08)

(56) References Cited

U.S. PATENT DOCUMENTS

| | | | |
|---|---|---|---|
| 11,701,066 B2* | 7/2023 | Yan | G06F 18/21 382/131 |
| 12,059,237 B2* | 8/2024 | Sahbaee Bagherzadeh | A61B 6/481 |
| 12,315,046 B2* | 5/2025 | Xu | G06T 11/008 |
| 2023/0329659 A1* | 10/2023 | Menon | A61B 6/5235 |

OTHER PUBLICATIONS

Parsons, Mark W. "Perfusion CT: is it clinically useful?", International Journal of Stroke, vol. 3, pp. 41-50 (Year: 2008).*

Gutierrez Munoz, Jose Alejandro. "Acute Ischemic Stroke Analysis Using Deep Learning-based Image-to-image Translation" (Year: 2023).*

Khan, Wasif, et al. "Physiology-Informed Generative Multi-Task Network for Contrast-Free CT Perfusion", arXiv preprint arXiv:2505.22673 (Year: 2025).*

Shurrab, Saeed, et al. "Multimodal machine learning for stroke prognosis and diagnosis: A systematic review", IEEE Journal of Biomedical and Health Informatics (Year: 2024).*

Fan, Jiawei, et al. "Multimodal image translation via deep learning inference model trained in video domain", BMC Medical Imaging 22:124 (Year: 2022).*

* cited by examiner

FIG. 2A
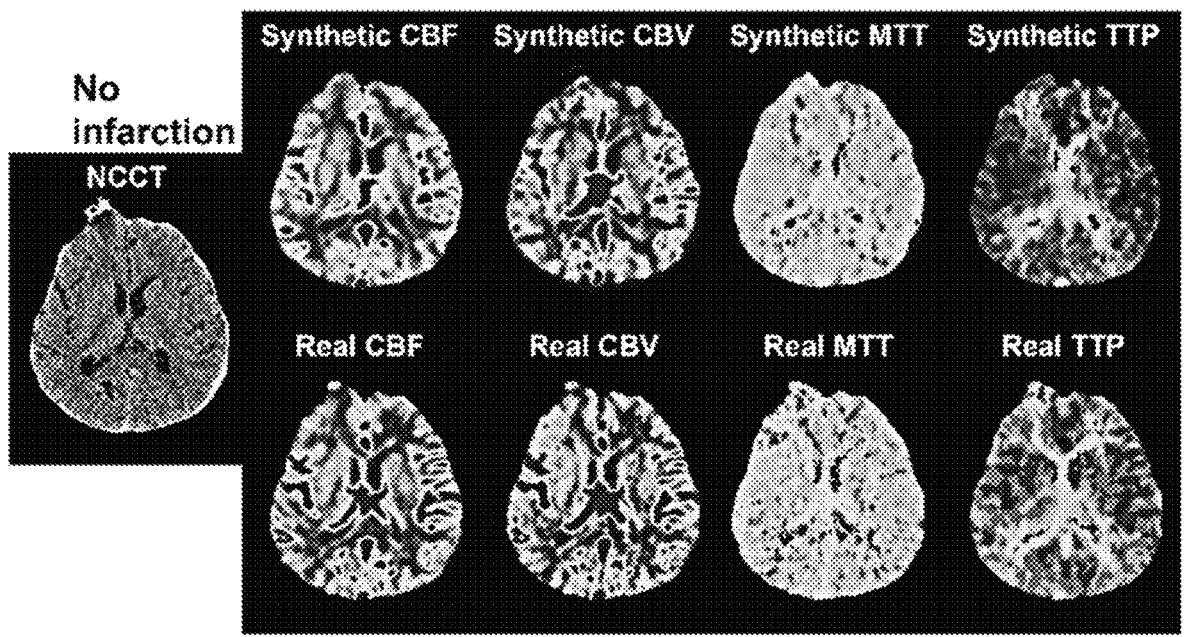
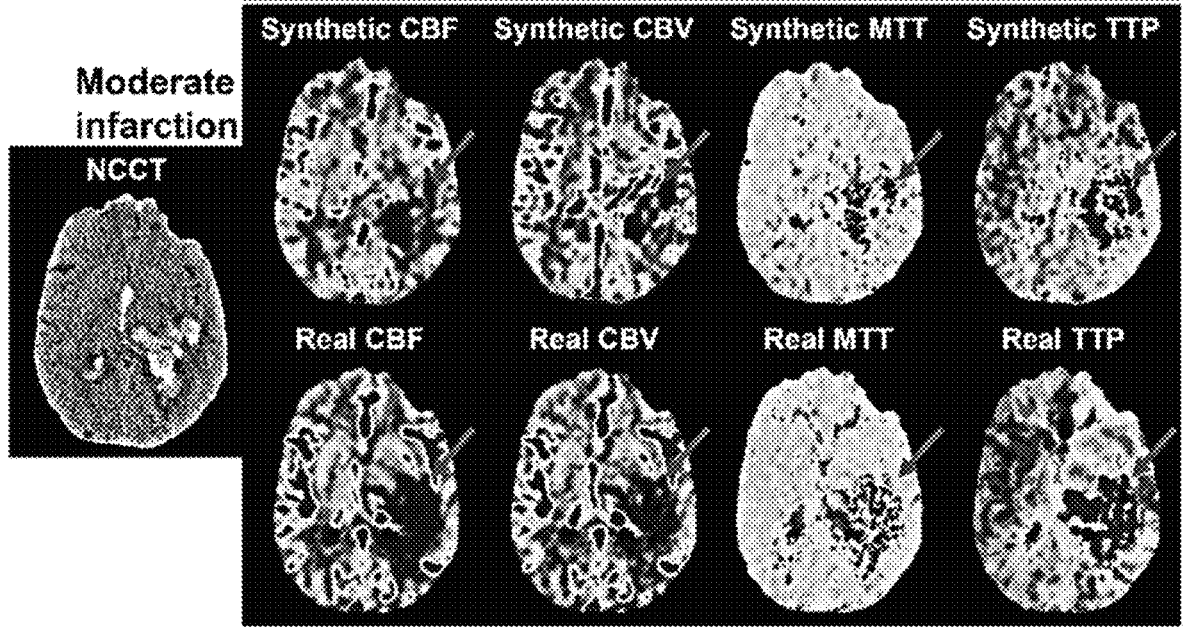
FIG. 2C

SSIM results for all map types.

|  | *MTT* | *TTP* | *CBF* | *CBV* |
|---|---|---|---|---|
| Mean | 0.794 | 0.797 | 0.830 | 0.816 |
| Std Dev | 0.031 | 0.033 | 0.036 | 0.034 |
| Std Err Mean | 0.004 | 0.004 | 0.005 | 0.004 |
| Upper 95% Mean | 0.802 | 0.806 | 0.840 | 0.824 |
| Lower 95% Mean | 0.786 | 0.789 | 0.821 | 0.807 |

UQI results for all map types.

|  | *MTT* | *TTP* | *CBF* | *CBV* |
|---|---|---|---|---|
| Mean | 0.945 | 0.907 | 0.931 | 0.903 |
| Std Dev | 0.021 | 0.029 | 0.024 | 0.027 |
| Std Err Mean | 0.003 | 0.004 | 0.003 | 0.003 |
| Upper 95% Mean | 0.951 | 0.914 | 0.938 | 0.910 |
| Lower 95% Mean | 0.940 | 0.899 | 0.925 | 0.896 |

Mean SSIM and standard deviation values for all map types and infarction classes.

| Infarction Class | *MTT* | *TTP* | *CBF* | *CBV* |
|---|---|---|---|---|
| None | 0.796 ± 0.031 | 0.808 ± 0.032 | 0.841 ± 0.032 | 0.823 ± 0.031 |
| Mild | 0.783 ± 0.029 | 0.785 ± 0.032 | 0.817 ± 0.041 | 0.804 ± 0.037 |
| Moderate | 0.793 ± 0.032 | 0.791 ± 0.033 | 0.823 ± 0.038 | 0.811 ± 0.036 |
| Severe | 0.807 ± 0.021 | 0.812 ± 0.021 | 0.846 ± 0.013 | 0.829 ± 0.017 |

Mean UQI and standard deviation values for all map types and infarction classes.

| Infarction Class | *MTT* | *TTP* | *CBF* | *CBV* |
|---|---|---|---|---|
| None | 0.952 ± 0.017 | 0.918 ± 0.025 | 0.942 ± 0.017 | 0.915 ± 0.017 |
| Mild | 0.934 ± 0.028 | 0.887 ± 0.035 | 0.923 ± 0.031 | 0.891 ± 0.037 |
| Moderate | 0.943 ± 0.016 | 0.903 ± 0.026 | 0.923 ± 0.023 | 0.896 ± 0.025 |
| Severe | 0.953 ± 0.01 | 0.919 ± 0.013 | 0.942 ± 0.009 | 0.914 ± 0.017 |

| Real CTP | R1, R2 | R1, R3 | R2, R3 |
|---|---|---|---|
| Question 1: | 0.6882 | 0.9747 | 0.6708 |
| Question 2A: | 0.9 | 1 | 0.9 |
| Question 2B: | 0.9 | 1 | 0.9 |
| Question 2C: | 0.5 | 0.1054 | -0.4216 |
| Question 2D: | 0.8433 | 0.7912 | 0.6351 |
| Question 3: | 0.8836 | 0.8738 | 0.9060 |
| Question 4: | 0.9557 | 0.9725 | 0.9553 |
| Average | 0.8101 | 0.8168 | 0.6494 |

FIG. 17A

| Synthetic CTP | R1, R2 | R1, R3 | R2, R3 |
|---|---|---|---|
| Question 1: | 0.6882 | 0.9733 | 0.6285 |
| Question 2A: | 0.7695 | 0.9733 | 0.8433 |
| Question 2B: | 0.8721 | 0.9733 | 0.8433 |
| Question 2C: | -0.2425 | 0.1768 | -0.8575 |
| Question 2D: | 0.7826 | 0.8018 | 0.8367 |
| Question 3: | 0.8966 | 0.9926 | 0.9060 |
| Question 4: | 0.9679 | 0.9688 | 0.9514 |
| Average | 0.6763 | 0.8371 | 0.5931 |

FIG. 17B

SYSTEMS AND METHODS FOR PREDICTING PERFUSION IMAGES FROM NON-CONTRAST SCANS

CROSS REFERENCE TO RELATED APPLICATIONS

This application claims priority to, and the benefit of, U.S. provisional application entitled "Systems and Methods for Predicting Perfusion Images from Non-Contrast Scans" having Ser. No. 63/395,561, filed Aug. 5, 2022, which is hereby incorporated by reference in its entirety.

STATEMENT REGARDING FEDERALLY SPONSORED RESEARCH OR DEVELOPMENT

This invention was made with government support under 1908299, awarded by the National Science Foundation. The government has certain rights in the invention.

BACKGROUND

Computed tomography perfusion (CTP) is a potent imaging modality used for the evaluation of the hemodynamic status of the brain and is widely used clinically in detecting abnormalities in the brain parenchyma. Decreased blood flow and blood volume to various vascular territories may indicate hypoperfusion, as seen in ischemic stroke in which a cerebral artery becomes occluded. In a rapid triage setting for acute ischemic stroke, the hypoperfused tissue must be identified, characterized, and revascularized before an irreversible infarct occurs. Multimodal CT, consisting of non-contrast CT (NCCT), CT angiography, and CTP, is usually conducted to assess acute ischemic stroke patients. CTP imaging has shown efficacy in identifying salvageable brain tissue that may recover with prompt therapy that will restore blood flow to the tissue.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2D illustrate examples of synthesized CTP imaging and corresponding ground truth CTP imaging, in accordance with various embodiments of the present disclosure.

FIGS. 16A-16B and 17A-17B illustrate examples of real and synthetic CT perfusion maps, in accordance with various embodiments of the present disclosure.

DETAILED DESCRIPTION

Figure 1A:
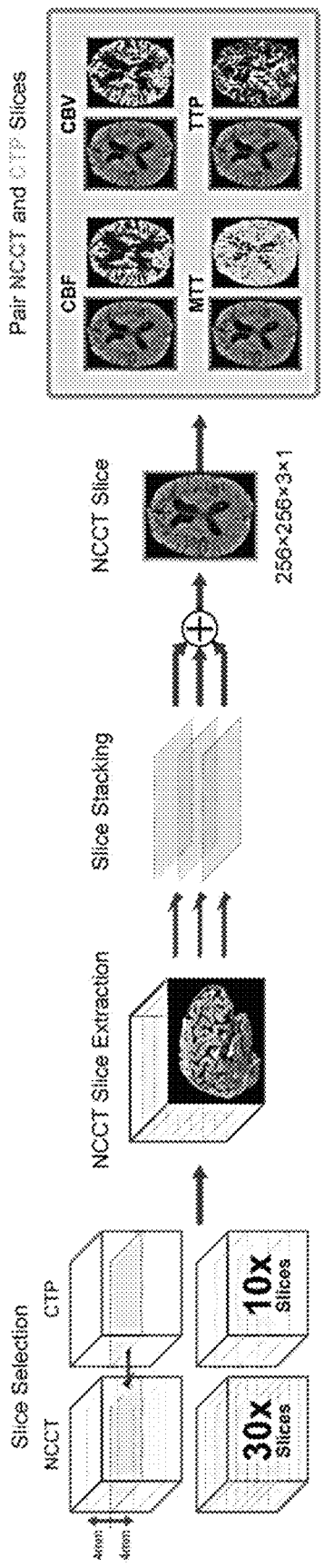
FIGS. 1A-1D illustrate an example of the proposed Model MAGIC pipeline for contrast-free CT perfusion map generation, in accordance with various embodiments of the present disclosure.

Disclosed herein are various examples related to predicting perfusion images from non-contrast scans. Reference will now be made in detail to the description of the embodiments as illustrated in the drawings, wherein like reference numbers indicate like parts throughout the several views.

In recent years, medical applications of deep learning (DL) have grown tremendously, especially with developments in DL-based algorithms for computer-aided diagnosis and radiologic image analysis, among other advancements. Recent advancements in DL analysis of radiologic imaging have optimized processes like image synthesis, restoration, segmentation, and object transfiguration. The potential of image-to-image translation enabled by DL to improve the efficiency of clinical diagnostic workflows is presented here. Image-to-image translation describes the task of transferring an image from a source domain to a target domain while preserving the content representations. By applying image-to-image translation techniques to analyze computed tomography (CT) imaging of the brain, the aim is to expand on the growing body of applications of DL in medical imaging and provide physicians with enhanced capabilities in understanding the relationship between the brain's hemodynamic activity and structure.

This disclosure presents systems and methods to utilize a DL approach to synthesize accurate and high-quality CTP maps from NCCT imaging to reduce the time and cost needed to identify the critical hemodynamic parameters associated with salvageable tissue versus ischemic brain injury. CTP operates via imaging a volume of brain tissue during the intravenous injection of an iodinated contrast bolus. This data is used to characterize the capillary-level perfusion within the brain and identify any regions of abnormal blood flow and blood volume. However, this imaging procedure is lengthy and requires contrast agent injection, resulting in an expensive and suboptimal protocol for the rapid triage setting. Furthermore, contrast imaging is generally safe but can present allergic reactions and adverse side effects, including headache, nausea, and skin hives. Less common but more severe side effects may occur, including cardiac and renal failure, loss of consciousness, seizures, and pulmonary edema. More than 70 million CT scans are conducted annually in the US, and a large proportion of these scans involve the use of an intravenous contrast agent. Contrast agent injection also results in longer turnover time and lower efficiency for medical facilities and staff. In addition to these concerns, the monetary cost associated with contrast imaging is substantial. Among CT, ultrasound, and MRI contrast-enhanced imaging procedures, the cost of contrast agents alone in the U.S. was estimated at $1.9 billion in 2020, with iodinated contrast media accounting for roughly 65% of the global contrast media market share. The use of contrast media is expected to show continued increases in the coming years as the global contrast media market is projected to reach $5.6 billion by 2027.

This disclosure demonstrates that DL algorithms empowered by big data can translate NCCT images into clinically diagnostic perfusion maps and establish a foundation for non-contrast perfusion map synthesis. This first-of-its-kind work has the potential to increase the efficiency of clinical triage by reducing or potentially forgoing intravenous contrast media injection while preserving high-quality, clinically relevant information about brain perfusion. For this purpose, the methodology includes an image-to-image translation approach and implements physiology-informed DL to generate contrast-injected perfusion maps from non-contrast imaging. If the DL yields clinically diagnostic perfusion maps from NCCT images, the structural and functional information hidden in the non-contrast scans, which is indiscernible by physicians, can be mined by DL through large-scale medical data. The capability of machine learning to predict non-contrast perfusion maps comparable to those generated by commercial software from contrast-enhanced images for rapid triage rather than replacing CTP scans in critical diagnostic settings is shown.

With the rapid evolution of DL, generative adversarial networks (GANs) have demonstrated state-of-the-art performance in medical image synthesis. At present, GAN-based image-to-image translation only maps between imaging modalities using conventional image-based loss functions. Consequently, conventional loss functions may not accurately portray the physiological laws governing the relationship among multiple medical imaging modalities captured from the same subject. Here, a deep learning framework named Model MAGIC, standing for Multitask Automated Generation of Intermodal CT perfusion, is introduced for non-contrast CTP brain imaging generation via physiology-informed multitask learning. FIGS. 1A-1D illustrate an example of the proposed Model MAGIC pipeline for non-contrast CT perfusion map generation. The multitask architecture offers benefits over traditional methods through improving data efficiency and leveraging shared physiological information among CTP map types. As shown in FIG. 1A, neighboring NCCT slices in the z-axis can be stacked to create a pseudo-RGB image and are matched with the corresponding perfusion maps to construct paired datasets for deep learning training and evaluation.

Figure 1B:
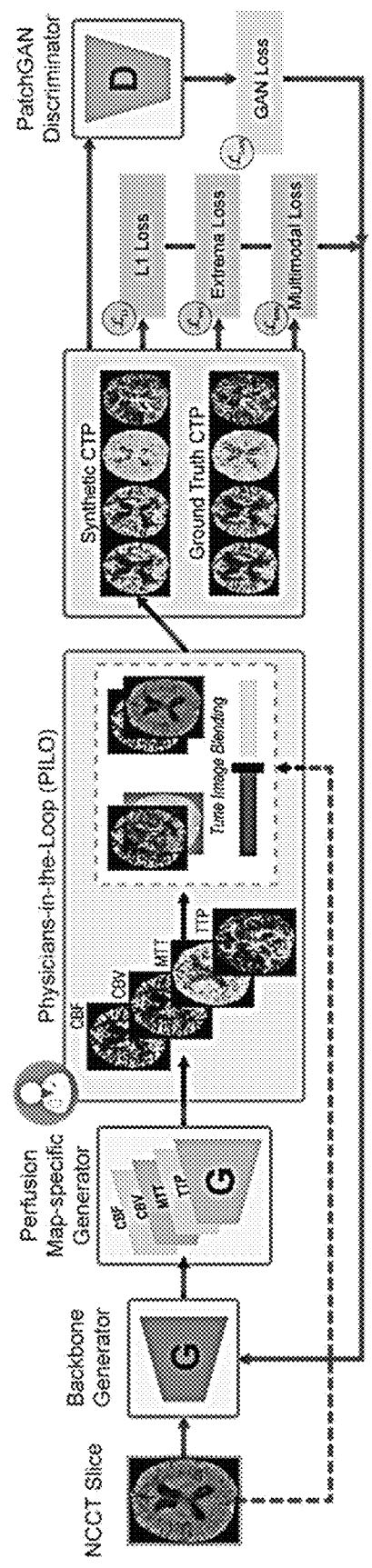
Figure 1C:
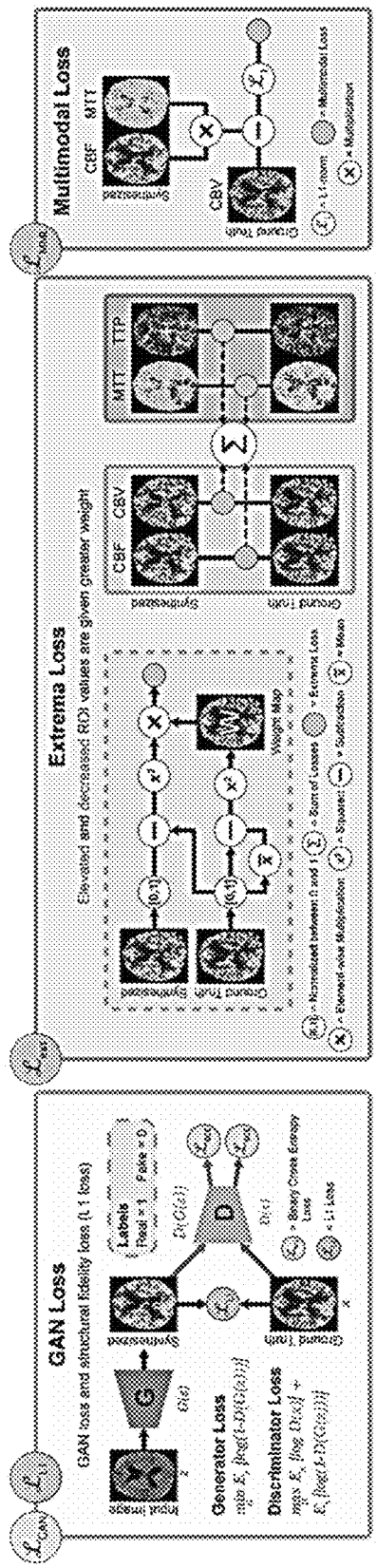
Figure 10:
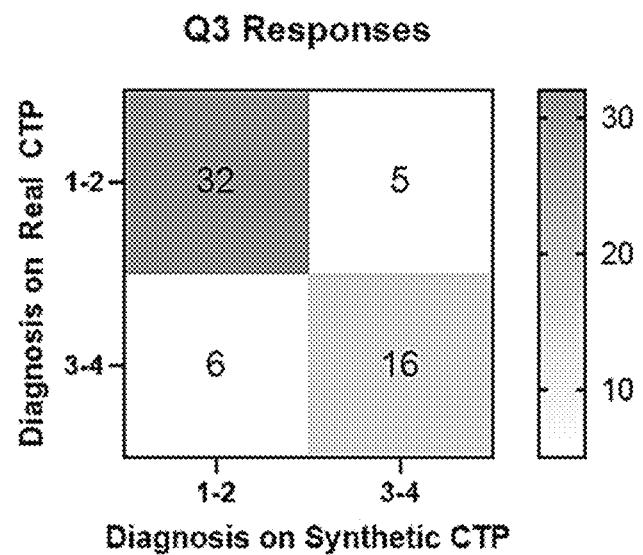

FIG. 10 illustrates examples of composite loss terms which contribute synergistically to Model MAGIC's high-quality performance. During training, GAN loss ($L_{GAN}$) and L1 loss ($L_{L1}$) can be used to ensure style consistency and structural fidelity in the synthesized imaging. The novel extrema loss ($L_{ext}$) can be used to ensure proper encoding of ischemic tissue regions, and the novel multimodal loss ($L_{MML}$) can be used to ensure physiological consistency across the synthesized perfusion maps. The perfusion maps are not independent of each other, and physiological principles govern their relationships among flow rate, transition time, and flow volume. This relationship can be encoded into DL in a multitask learning paradigm to a significant degree to follow the physiological rule. More precisely, the generated perfusion maps will follow the relationship between cerebral blood flow (CBF), mean transit time (MTT), time to peak (TTP), and cerebral blood volume (CBV). Another innovation is to bring the physicians into the loop so the perfusion map generation can be effectively guided by functional principles and used by domain experts oriented towards a specific task. To achieve this, a Physicians-in-the-Loop (PILO) module was implemented, which allows a group of physicians to evaluate and select task-specific, patient-individualized, and radiologist-preferred diagnostic maps of hemodynamic versus anatomical structures in constructing the final CTP map. FIG. 1B illustrates the Model MAGIC comprising a generative adversarial network to co-learn between the generator and discriminator networks with novel physiology-informed loss terms and Physicians-in-the-Loop (PILO) interactive module to allow radiologists to visually judge the optimal ratio between non-contrast structural information and synthesized perfusion information.

Figure 1D:
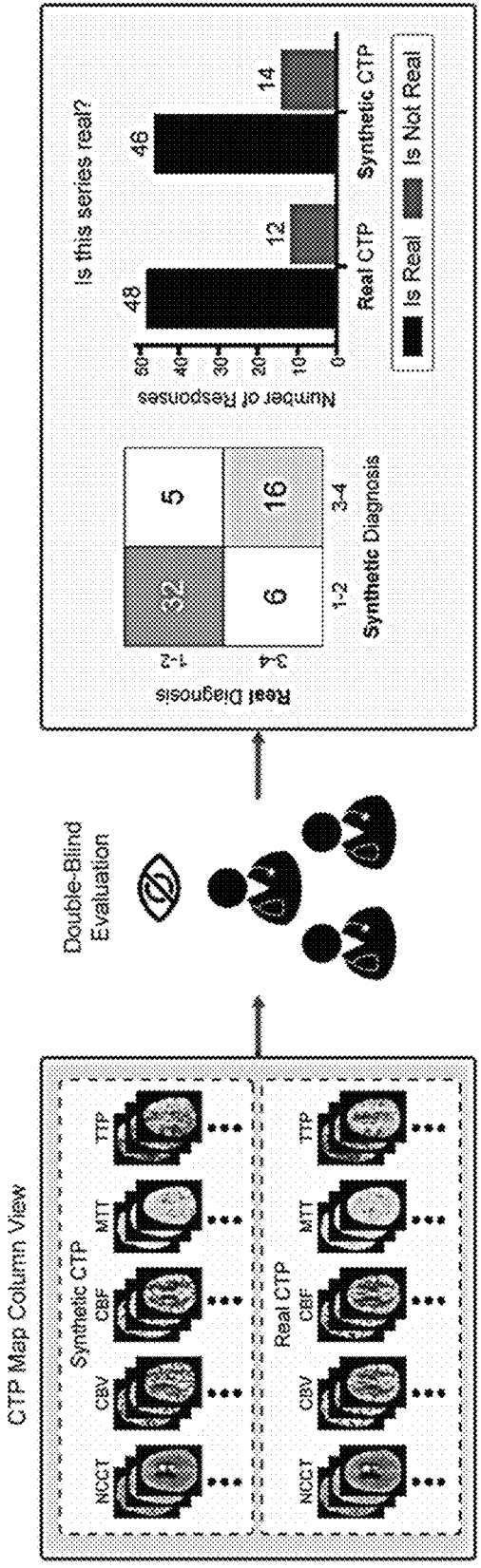
Figures 2B, 2D:
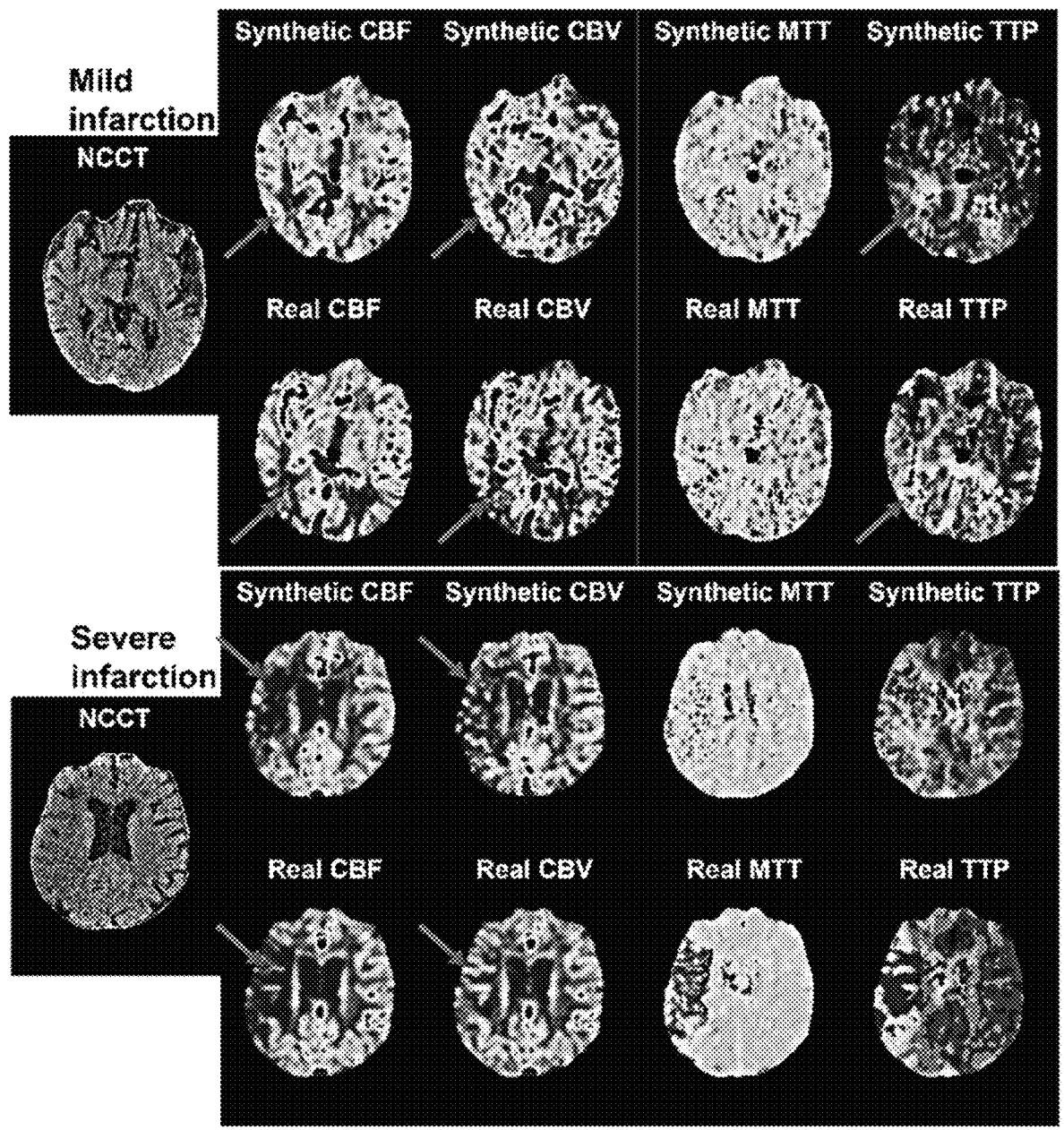

By scaling down the weights associated with NCCT in the final layer of the Model MAGIC, more information about the embedded microcirculation may be revealed in the synthesized perfusion maps. This interactive tool allows physicians to make an optimized, individualized judgment on disease diagnosis. Application of the trained Model MAGIC on NCCT images from a radiology dataset confirmed that the Model MAGIC can learn the image-to-image translation direction from NCCT to multiple CT perfusion maps simultaneously and produce diagnostic-level perfusion maps that could not be visually differentiated from real CT perfusion imaging by three experienced neuroradiologists in a double-blinded review in terms of the realistic level and diagnostic quality as shown in FIG. 1D.

Performance in Synthetic Accuracy and Structural Fidelity

To evaluate the performance of the Model MAGIC, a clinical dataset consisting of 12,816 subjects from the UF Health PACS system who have gone through both NCCT and CTP between 2013-2020 was used. CTP data were analyzed using RAPID CT Perfusion analysis software (e.g., iSchemaView, Menlo Park, CA., USA), termed as "RAPID" below, to generate four CTP maps. Radiologists' evaluation was performed on NCCT and CTP imaging data from 62 patients. Of this test set, 20 subjects exhibited regular, healthy cerebral perfusion activity, 13 exhibited mild ischemia, 23 exhibited moderate ischemia, and 6 exhibited severe ischemia. We applied the same preprocessing methods of skull stripping, slice extraction, and registration to these patients' NCCT and CTP series. We applied the trained MAGIC to NCCT images for each patient and generated four synthesized perfusion outputs (MTT, TTP, CBF, and CBV). An example of the synthesized CTP imaging and the corresponding ground-truth CTP imaging is shown in FIGS. 2A-2D.

A visual comparison of real CTP maps and synthetically generated maps via Model MAGIC shows efficacy in characterizing the brain's hemodynamic activity from NCCT imaging alone. Model MAGIC shows robustness to the patient's severity of ischemia, performing comparably for patients exhibiting no infarction in FIG. 2A, mild infarction in FIG. 2B, moderate infarction in FIG. 2C, and severe infarction in FIG. 2D. While the synthetic imaging may not perfectly capture pixel-by-pixel perfusion activity present in the real CTP imaging, the overall clinical trends are consistent with the ground truth (the same is true for perfusion maps generated using different commercial software from the same CTP imaging.) For example, FIGS. 2C and 3D both show similar trends in decreased CBF and CBV and increased MTT and TTP in the stroke regions of both the real and synthetic CTP imaging for patients with moderate and severe infarction. This is useful for radiologists to rapidly assess a patient's urgency status and determine therapeutic plans as the overall clinical indications of the synthetic imaging are largely correct.

Figure 3:
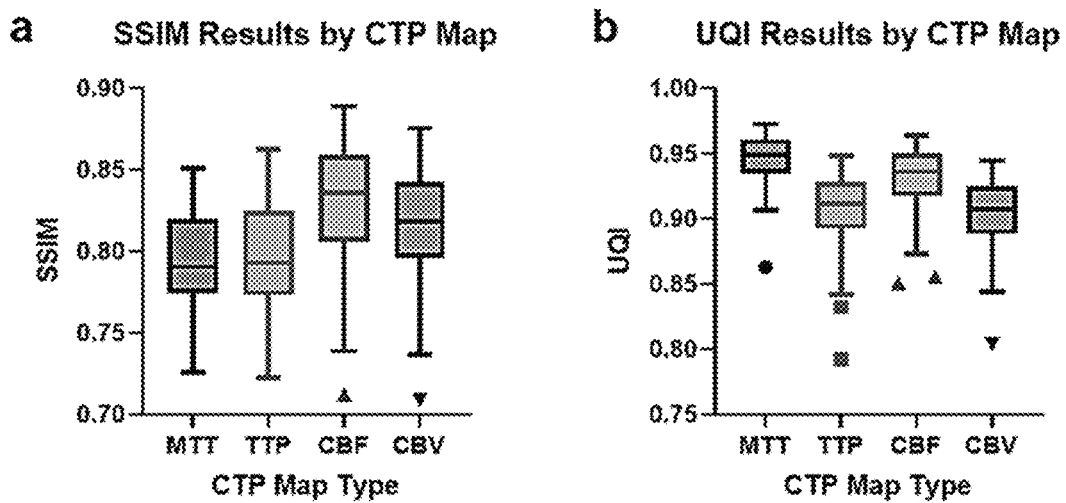
FIG. 3 illustrates examples of model results evaluated using structural similarity index metric (SSIM) and universal quality index (UQI) metrics, in accordance with various embodiments of the present disclosure.
Figure 4:
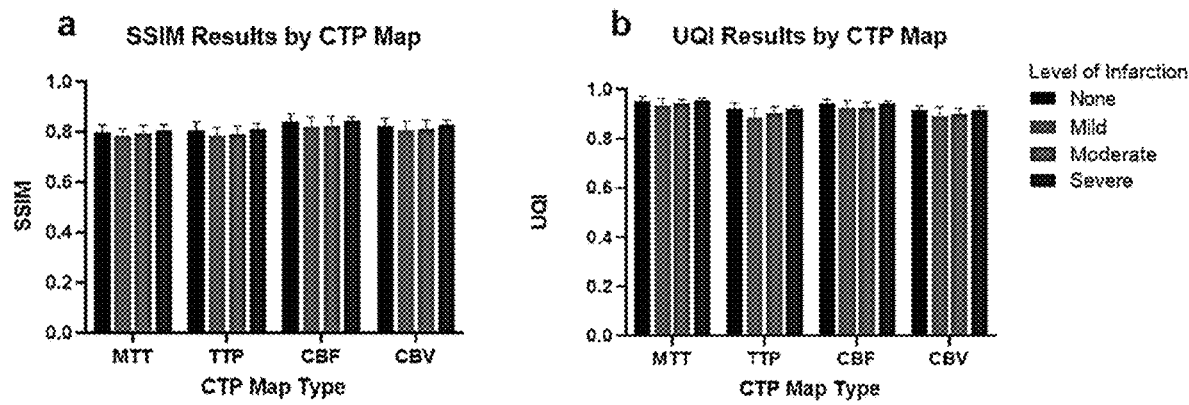
FIG. 4 illustrates examples of UQI and SSIM results and comparison of infarction classes, in accordance with various embodiments of the present disclosure.

Each synthesized perfusion image slice was evaluated against its corresponding ground-truth perfusion image slice by calculating the universal quality index (UQI) and the structural similarity index metric (SSIM) for each synthetic and real image pair. The boxplots of these metrics for each perfusion map type are shown in FIG. 3, where both SSIM and UQI show high fidelity synthesis of the real perfusion maps. Across all perfusion map types and grades of ischemia, SSIM and UQI evaluation values remained consistently high, as shown in FIG. 4, indicating good performance in accurately synthesizing the structure of the ground-truth perfusion imaging. The tables summarize the SSIM and UQI results for all map types.

Clinically, SSIM and UQI are considered important metrics since they indicate structural fidelity and suggest similarity in the diagnostic quality of a target and a reference image. The aim is to produce imaging that reflects both the visual style and the diagnostic information of the ground-truth imaging, and this can be achieved as shown by the consistently high UQI and SSIM values across all perfusion map classes. Through a visual comparison of the results in FIGS. 2A-2D, it can also be seen that the synthesized perfusion imaging shows efficacy in accurately characterizing both the style of each perfusion map type and the content encoded in that image. While the synthesized CTP data may not be pixel-perfect predictions of the real CTP data, just like perfusion maps generated using different commercial CTP software are not pixel-to-pixel identical, the synthesized imaging represents global- and local-scale trends in the imaging that could provide sufficient diagnostic information about a patient's brain perfusion activity. Overall, the trends in clinical diagnosis are correct, and the synthetic perfusion results produced by the MAGIC indicate high levels of structural agreement with the clinical perfusion imaging.

Robustness to Abnormal Perfusion Activity

An important metric to evaluate MAGIC is whether it performs well under abnormal perfusion conditions, such as mild or severe ischemia. To assess performance under these pathological conditions, we stratified our test set into four subsets depending on the severity of the ischemic condition: no ischemia, mild ischemia, moderate ischemia, and severe ischemia. FIG. 4 presents the results of stratifying the calculated SSIM and UQI values for each perfusion map type by the subject's level of infarction (infarction status). Error! Reference source not found. The data of FIG. 4 show (a) mean SSIM values exceed 0.780 and (b) mean UQI values exceed 0.890 across all map types and infarction classes, indicating very high structural integrity in the synthesized CTP imaging. The mean and standard deviation SSIM and UQI values are provided in the tables. There is little deviation in the SSIM and UQI values across infarction classes, indicating that MAGIC performs comparably across different disease presentations. The algorithm's performance quality does not differ with respect to the patient's disease presentation, indicating that MAGIC is largely robust to abnormal presentations of perfusion activity.

PILO Module Integrates Anatomical and Hemodynamic Information

The Physician-In-the-Loop (PILO) module was designed by concatenating the initial NCCT input with the penultimate CTP output in the final layers of the generator. This concatenation is passed through a final transposed convolution layer to produce the final synthetic perfusion output. The physician adjusts the weights of this transposed convolution layer to scale the hemodynamic activity available in the synthetic perfusion imaging and the anatomical information available in the NCCT.

Because of the PILO module, the MAGIC model is an end-to-process model which enables domain experts to conduct task-specific investigations with liberty. The weights of the final deconvolutional layer of the PILO module can be scaled to either increase or decrease the representation of hemodynamic and anatomical information in the output. As the perfusion information ratio is increased, the hemodynamic information is further exaggerated in the synthetic CTP imaging. Similarly, as the perfusion information ratio is decreased, the amount of anatomical information present in the synthetic CTP imaging is increased. The domain experts can leverage this module as an exploratory tool to make an informed clinical decision regarding a patient's condition.

Figure 5A:
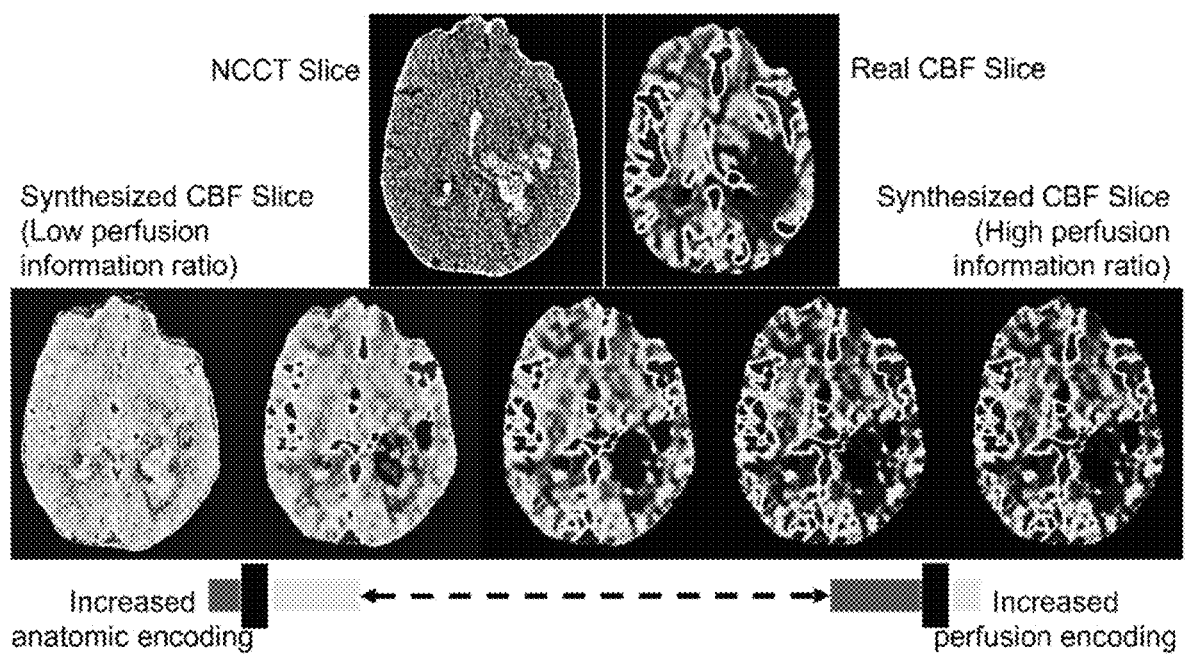
FIGS. 5A and 5B illustrates examples of the effect of weight scaling in the Physicians-in-the-Loop (PILO) module, in accordance with various embodiments of the present disclosure.
Figure 5B:
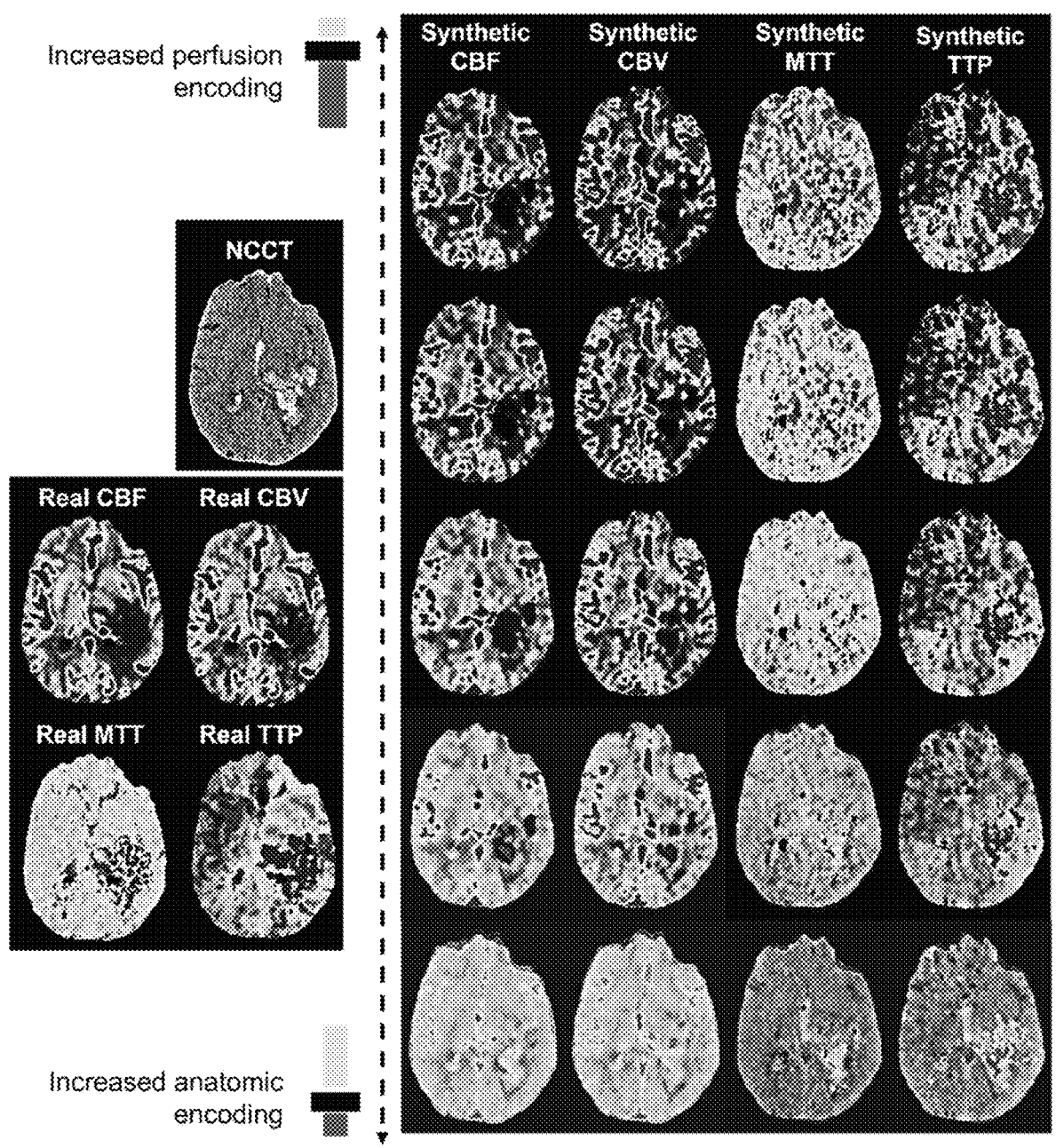

FIG. 5A illustrates the effect of rescaling the ratio of weights in the PILO module that correspond to the encoding of anatomic and perfusion data. An example of tuning the PILO module for all map types is illustrated in FIG. 5B, which demonstrates the effect of adjusting the perfusion information ratio in the PILO module for a patient exhibiting moderate infarction. By adjusting this ratio, it is possible to adjust between the encoding of strictly perfusion data and strictly anatomical data that is represented in the final map. As illustrated, emphasized encoding of perfusion information may be useful in further exploring and visualizing large-scale trends in the patient's perfusion activity, like acute ischemia in the given sample. Similarly, emphasized encoding of anatomical information could help match the hemodynamic maps to the anatomical structures in the brain. These examples show that tuning the weights in this module may serve to visualize trends in the brain's perfusion activity by emphasizing the encoding of perfusion information. While these results are not quantitative, they illustrate the role of PILO as an exploratory diagnostic tool for physicians to further investigate the brain perfusion activity of a given patient.

Figure 6:
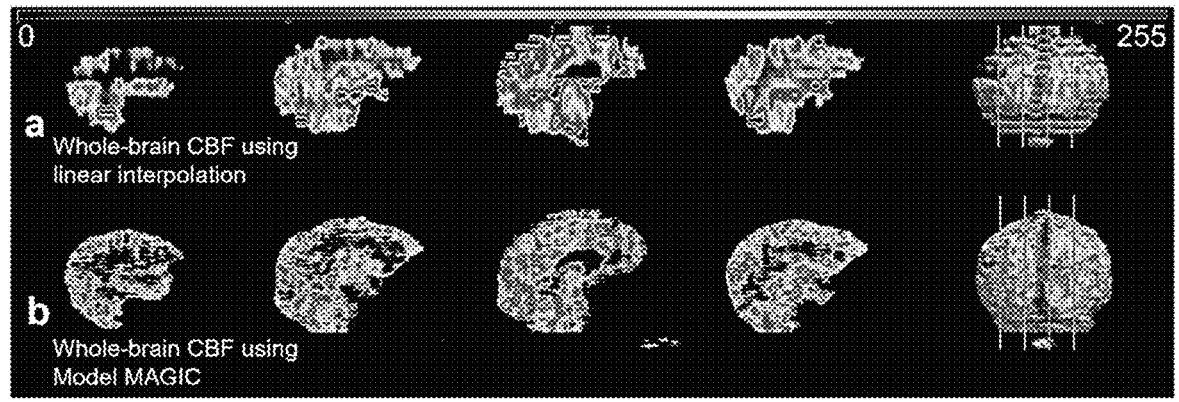
FIG. 6 illustrates examples of linear spatial density of whole-brain maps, in accordance with various embodiments of the present disclosure.

Model MAGIC Generates Higher-Fidelity and Higher Spatial Resolution Three-Dimensional Perfusion Maps Since the input to MAGIC are NCCT images, the model can generate perfusion maps for each slice of the NCCT. This means that MAGIC generates high spatial resolution axial-view perfusion maps at the axial resolution of 1 mm. This is much better than commercial software, which presents perfusion maps at an acquired axial resolution of roughly 8 mm[25] to reduce the scanning time during perfusion imaging. The three-dimensional view of the perfusion maps generated with MAGIC has a very high spatial resolution, allowing for informed clinical decisions. This is shown in FIG. 6, which illustrates the increased linear spatial density of whole-brain perfusion maps enabled by Model MAGIC.

In the top row (a), the whole-brain perfusion map is reconstructed using linear interpolation between 8 mm CBF map slices generated using RAPID CT Perfusion analysis software. This results in a jagged, overly smoothed appearance that does not maintain much detail of the brain's structure. In the bottom row (b), the whole-brain CBF map is reconstructed by applying Model MAGIC to an NCCT volume. The synthetic CBF volume maintains a higher level of detail and structural soundness at a higher spatial density. By using the Model MAGIC method to synthesize perfusion maps at each slice location from the high-resolution NCCT volume, important edge detail and activity are preserved in visualizing whole-brain perfusion activity.

Figure 7:
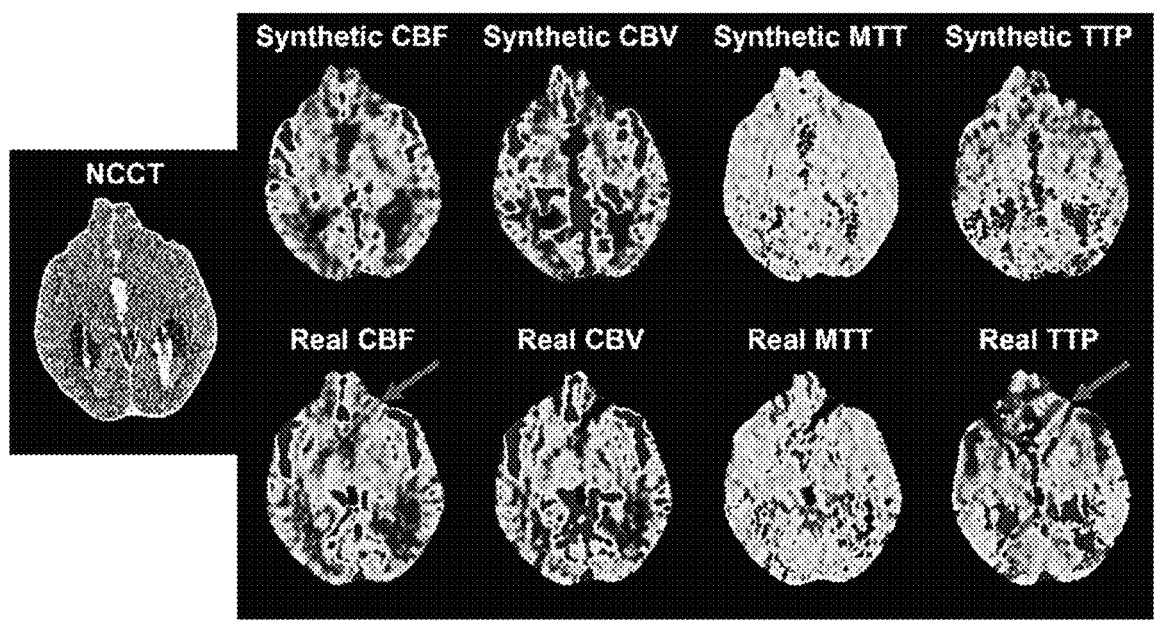
FIG. 7 illustrates examples of synthesized CTP imaging and corresponding ground truth CTP imaging, in accordance with various embodiments of the present disclosure.

Moreover, Model MAGIC can reduce the possibility of motion artifacts in the generated perfusion maps. Head movement during CTP acquisition is a common occurrence that leads to the production of motion artifacts in the produced imaging. NCCT imaging has a much shorter exposure time than CTP imaging, so there is lower susceptibility to motion artifacts. Synthesizing perfusion imaging from NCCT imaging presents a possibility of obtaining perfusion imaging without motion artifacts. As demonstrated in FIG. 7, Model MAGIC can synthesize perfusion maps imaging that is less susceptible to the presence of artifacts. For the given sample, the subject's ground-truth perfusion imaging generated using RAPID contains streaking due to motion artifacts. However, the synthesized CTP maps via Model MAGIC do not contain these artifacts. Traditional perfusion maps need to administer an intravenous contrast agent and repeatedly image the sections of the brain to acquire the hemodynamic data, but this is not needed for MAGIC. The benefits present in NCCT imaging offer advantages in synthesizing non-contrast perfusion maps via MAGIC, as this mitigates some of the primary limitations of traditional CTP imaging.

Clinical Evaluation and Diagnostic Validation

Imaging metrics alone are not indicative of the ability of MAGIC's diagnostic quality. To evaluate the performance of MAGIC in clinical diagnosis, 20 of the 62 patient scans were independently evaluated by three radiologists in a double-blinded fashion and scored in relation to four criteria: authenticity, diagnostic quality, diagnosis, and diagnostic confidence, which are directly related to the clinical diagnosis outcomes. The experiment was split into two portions in which the radiologist received either the synthetic CTP or the ground truth CTP for each patient. A random shuffle was conducted to determine which ground truth or synthetic CTP would be included in each trial of the experiment. This random shuffle was done in such a way that neither the researchers nor the radiologists knew whether the patient's representative image was ground truth or synthetic. In the experiment, the proportion of realistic and unrealistic CTP images produced by the commercial software RAPID and MAGIC was compared.

Figure 8:
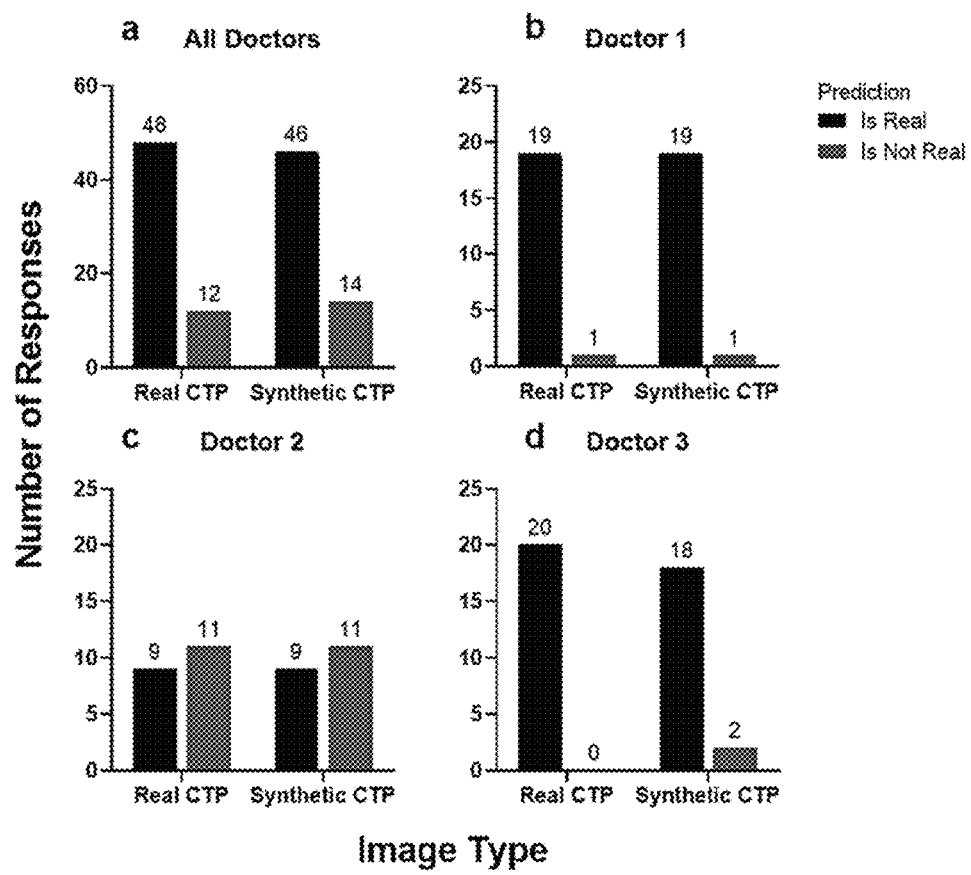
FIGS. 8-11 illustrate results of a double-blinded questionnaire, in accordance with various embodiments of the present disclosure.

FIG. 8 presents the results of Question 1 of the double-blinded questionnaire: "Do you think this is a real CT perfusion map?" The result of plot (a) demonstrates that all raters were unable to differentiate between real and synthetic CTP imaging. The results of each rater exhibit comparable ($p<0.05$) proportions of predicted classes between the real and synthetic classes as shown in plots (b-d), as determined with 2-sample equality of proportions test with continuity correction. In FIG. 8, the clinical evaluation showed that the CTP maps generated using MAGIC and RAPID have statistically comparable performances in terms of clinical authenticity. Even with different radiologist-specific preferences, all raters were consistent with their classification rates across the two groups of real and synthetic perfusion maps. The table shows P-Values for the hypothesis for the 2-sample equality of proportions test with continuity correction for Question 1. There is not enough evidence to reject that the proportions are equal for all the raters pooled together, Rater 1, Rater 2, or Rater 3. This indicates that the proportions of realistic CTP among the RAPID and MAGIC-generated CTP maps are comparable.

Figure 9:
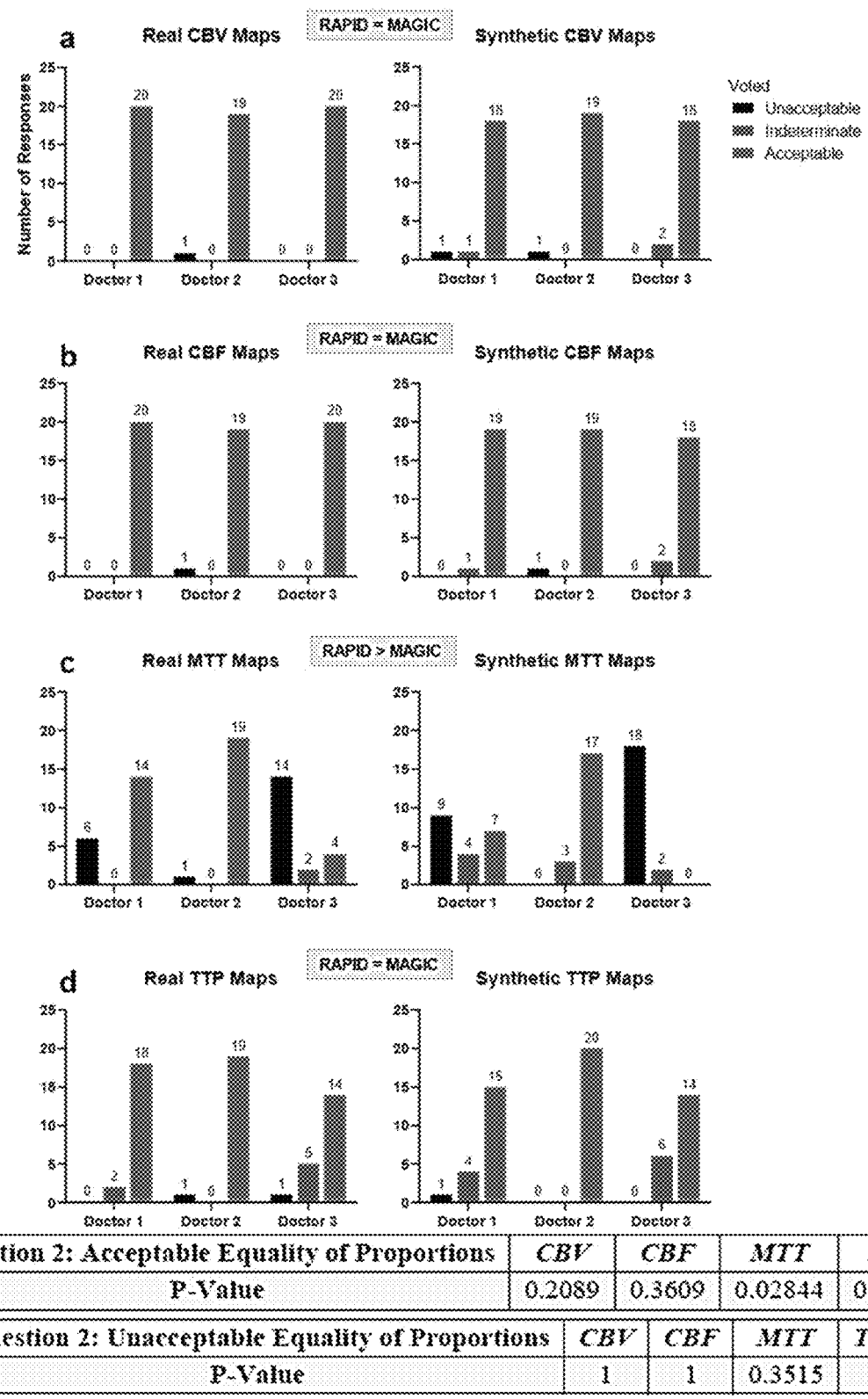

Next, the diagnostic quality of the synthetic images across the different map types was analyzed. In FIG. 9, perfusion maps generated using MAGIC and RAPID achieved comparable clinical diagnostic quality in CBV, CBF, and TTP maps, though Rater 3 indicated that RAPID generates more clinically diagnostic MTT maps. FIG. 9 illustrates the individual response distribution comparison between the real and synthetic CTP for questions 2A-2D (see below): "What is the diagnostic quality of this perfusion map?" The response counts for whether the perfusion map type was acceptable, indeterminate, or unacceptable for the real and synthetic CTP divided by the (a) CBV, (b) CBF, (c) MTT, and (d) TTP maps.

As shown in the first table of FIG. 9, the proportion of acceptable images for the real and synthetic was comparable for the CBV, CBF, and TTP maps (maps a, b, and d). The synthetic images produced a smaller proportion of acceptable images than the real for MTT (c). The first table illustrates P-Values for the hypothesis for the acceptable 2-sample equality of proportions test with continuity correction for questions 2A-2D (see below). There is not enough evidence to reject that the proportions are equal for CBV, CBF, and TTP. This means that for those maps, the proportion of acceptable images is comparable among RAPID and MAGIC-generated CTP maps. There was enough evidence to reject the null for the MTT map. This indicates that MAGIC produces a smaller proportion of acceptable MTT images when compared to RAPID.

In the second table of FIG. 9, the proportion of unacceptable images for the real and synthetic was comparable for the CBV, CBF, MTT, and TTP maps (a-d). The second table illustrates P-Values for the hypothesis for the unacceptable 2-sample equality of proportions test with continuity correction for questions 2A-2D (see below). There is not enough evidence to reject that the proportions are equal for CBV, CBF, MTT, and TTP. This indicates that for all maps, the proportion of unacceptable images is comparable among RAPID and MAGIC-generated CTP maps.

FIG. 10 illustrates the confusion matrix for responses to Q3: "What diagnosis would be given to this patient based on their NCCT and CTP imaging?" Diagnostic ratios are grouped by Infarct Core to Tissue at Risk ratio less than 20% (1-2) and greater than 20% (3-4). The rate of the same diagnosis between the real CTP and synthetic CTP is 81%, and the rate of inconsistent diagnosis is 19%. In FIG. 10, it is shown that real and synthetic CTP maps had 81% agreement by radiologists in stratifying patients into low and high infarct core-to-tissue at risk ratios. This result indicates that the synthetic CTP maps maintain diagnostically relevant information.

Figure 11:
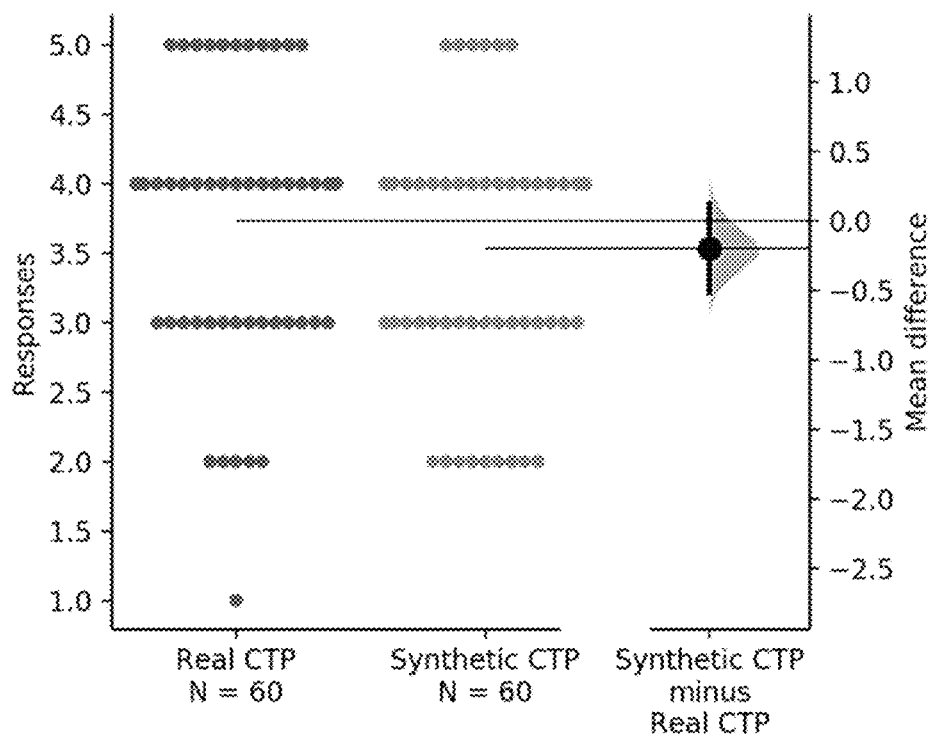

Finally, FIG. 11 illustrates that the mean diagnosis confidence between realistic and unrealistic CTP images was comparable. FIG. 11 shows the mean difference between Real CTP and Synthetic CTP diagnostic confidence for responses to Q4: "Rate your confidence in the above diagnosis." The responses of three raters for the real and synthetic CTP maps are plotted on the left. The mean difference between each paired sample is plotted on the right floating axis as a bootstrap sampling distribution, and the corresponding 95% confidence interval of the mean difference is illustrated by the vertical error bar. These data indicate that the mean confidence in diagnosis for the synthetic and real CTP are comparable. The p-value of the 0.05 level two-sided permutation t-test is 0.18.

In summary, Model MAGIC generates perfusion maps with diagnostically competitive performance and clinical value compared to commercial software, with the marked advantages of substantially improving the clinical door-to-needle time by forgoing contrast agent injection and perfusion imaging acquisition, yielding faster, cheaper, safer triage process for acute stroke, saving critical time for this "time is tissue" disease, at reduced healthcare costs and patient risks.

Datasets

Neuroimaging data were retrospectively retrieved from 12,186 (7.76 TB) patients at UF Health between 2013 and 2020 with Institutional Review Board (IRB) approval. The perfusion studies were conducted using an injection of an iodine-based contrast agent, and the collected data were analyzed using RAPID CTP analysis software to generate each CTP map. The data was filtered to only include patients with RAPID analyzed data and NCCT imaging, resulting in 493 patients being selected for this study. Among them, 431 subjects were utilized for training, and the remainder of the data of 62 patients were reserved for testing. Further augmentations were applied to the training data, including reflection, random rotation between −10 degrees and 10 degrees, and random vertical and horizontal translations between −30 and 30 pixels in each direction. After extracting and applying augmentations to paired NCCT and CTP data, 16,308 (14.9 GB) paired slices of NCCT and CTP images were used to train the MAGIC model. Upon being loaded into the training environment, each image was normalized with a mean of 0 and a standard deviation of 1.

Preprocessing. The axial direction spatial resolution was 10 mm for CTP volumes and 1 mm for NCCT volumes. 10 CTP slices located at central axial locations were selected for analysis for each subject. All slices in the CTP series were coordinated with one NCCT slice at the corresponding vertical location and two NCCT slices at a predefined vertical offset of 4mm between slices. By stacking sequential NCCT slices at a spatial offset to create a pseudo-RGB image, Model MAGIC can accurately synthesize cerebral perfusion structures and generate higher quality images than those generated without a spatial offset in the NCCT input, largely due to the additional spatial information in the slices above and below the target slice. Additionally, each patient's NCCT series was collected. The data were deidentified, and all images were resized to 256×256 pixels. For the NCCT series, each slice was rescaled with a window center of 40 HU and a window width of 80 HU. Skull-stripping was conducted on each NCCT slice to focus on the brain tissues for further analysis.

ischemia severity. RAPID yields diagrams for each patient of identified regions of infarct core (defined by $CBF<30\%$) and ischemic penumbra (defined by $TTP>6$ s). The patients in this dataset presented a variety of acute ischemic stroke presentations, ranging from healthy to severely infarcted. The indicated regions in the RAPID data were used to create ROI masks to further evaluate MAGIC's performance in encoding infarcted brain regions. The ROI masks were used to extract ratios of the infarct core volume to the tissue at risk volume. These ratios were used to classify each patient as either presenting no ischemia, mild ischemia, moderate ischemia, or severe ischemia.

Model MAGIC

In this study, a model entitled Model MAGIC has been proposed for the synthesis of individual perfusion parametric maps—CBV, CBF, MTT, and TTP—from NCCT imaging to improve the time, accessibility, safety, and cost associated with CTP imaging.

Perfusion maps. Here, the definition of the perfusion maps briefly introduced. CBV is a measure of blood volume in a brain tissue region and is typically measured in mL of blood per 100 g of brain tissue. CBF is a measure of the rate at which blood travels through the brain tissue and is typically measured in units of mL of blood per 100 g of tissue per minute. MTT is a measure of average bolus transit time through a volume of brain tissue from the arterial input to the venous output and is typically measured in seconds. TTP is a measure of the time required for a given tissue volume to reach maximal enhancement and is typically measured in seconds. CTP imaging is valuable in assessing diseases characterized by altered brain perfusion activity, including ischemic stroke. The core infarct of ischemic stroke is characterized by increased MTT and TTP and decreased CBF and CBV. The penumbra of ischemic stroke is characterized by increased MTT and TTP with moderately decreased CBF and near-normal CBV. A bounding box can be applied to the brain region in both the synthesized and ground-truth perfusion imaging to ensure that results are not be skewed by the background space surrounding the brain tissue in each image.

A novel GAN architecture, titled Model MAGIC, is proposed for the task of NCCT to CTP translation. Model MAGIC is based on the traditional pix2pix architecture with novel multitask architecture and physiology-informed loss functions as an image-to-image translation network. In contrast to traditional image translation networks, Model MAGIC enables greater performance in this task due to 1) simultaneous generation of multiple CTP maps, 2) shared encoding layers between perfusion maps to improve performance and reduce training costs, 3) physiology-informed loss terms that leverage MAGIC's multitask architecture, 4) real-time generation of perfusion maps without contrast agent injection, 5) high spatial resolution in the axial direction and 3D models, 6) model is generalizable to any additional perfusion maps, and 7) last but not the least, a novel Physician-In-The-Loop (PILO) module, which is a tunable convolution layer to provide a physician-computer interface to allow physicians adjust the contribution of perfusion and anatomical information in the synthesized CTP maps to facilitate clinical decision making. This project overview is summarized in FIGS. 1A-1D Error! Reference source not found.

Figure 12:
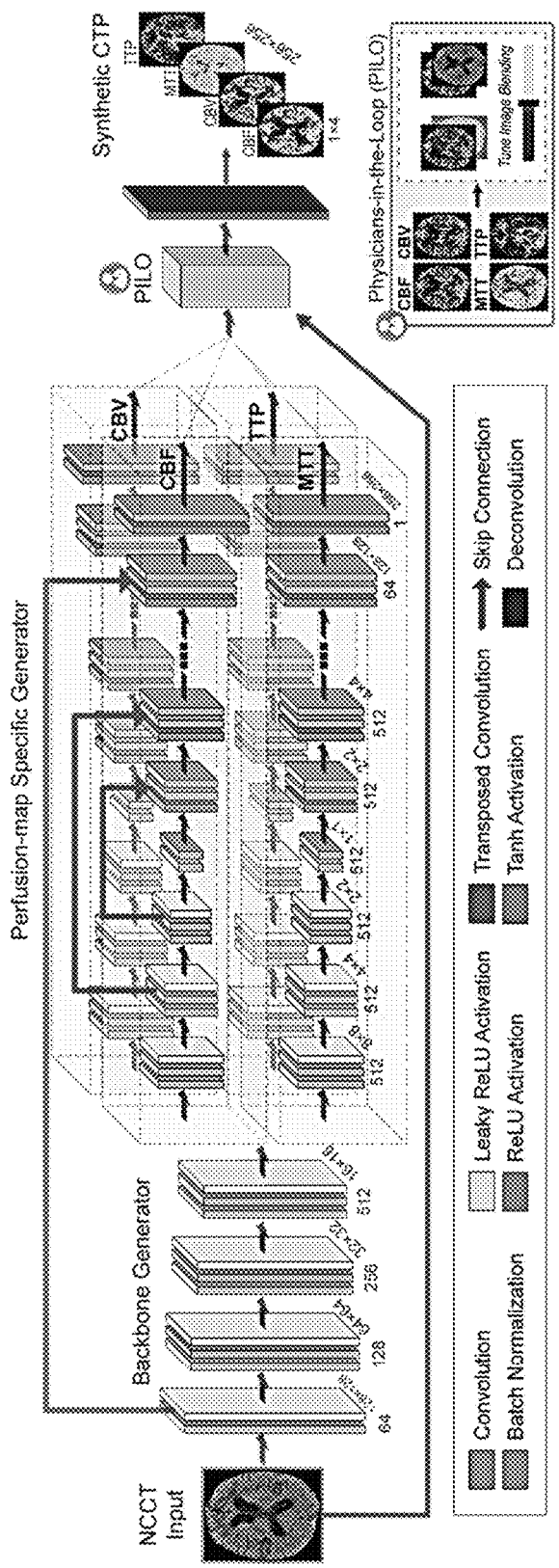
FIG. 12 is a schematic diagram illustrating an example of a generator network architecture, in accordance with various embodiments of the present disclosure.

Generator. The generator of Model MAGIC is inspired by a U-NET convolutional neural network (CNN) architecture, containing a series of convolutional (encoding) layers and transposed convolution (decoding) layers that are paired using skip connections. FIG. 12 illustrates how the generator architecture enables MAGIC's multitask learning by applying a series of four encoding layers to a given NCCT input.

A diagram of the generator network architecture is provided in FIG. 12. The generator follows a modified U-Net architecture, with various network layers connected by skip connections. The first encoding layers can share the encoded weights of each map before diverging into multi-task perfusion map generation. The PILO module comprises the final layers of the architecture in which the NCCT input is concatenated with the initial perfusion output. A final deconvolutional layer is applied to generate the final perfusion map outputs. Four additional unique encoding layers follow these shared encoding layers to produce four final encoded tensors, each of, e.g., size [512×1×1]. Each tensor can then be passed through a unique series of eight decoding layers to produce an output tensor of, e.g., size [256×256×1]. Finally, each output tensor can be concatenated with the original NCCT input of, e.g., size [256×256×3] to produce a tensor (e.g., a [256×256×4] tensor), which is passed through the PILO module. This module reduces the dimensions of the final tensor to, e.g., [256×256×1], producing the corresponding CTP map slice.

Figure 13:
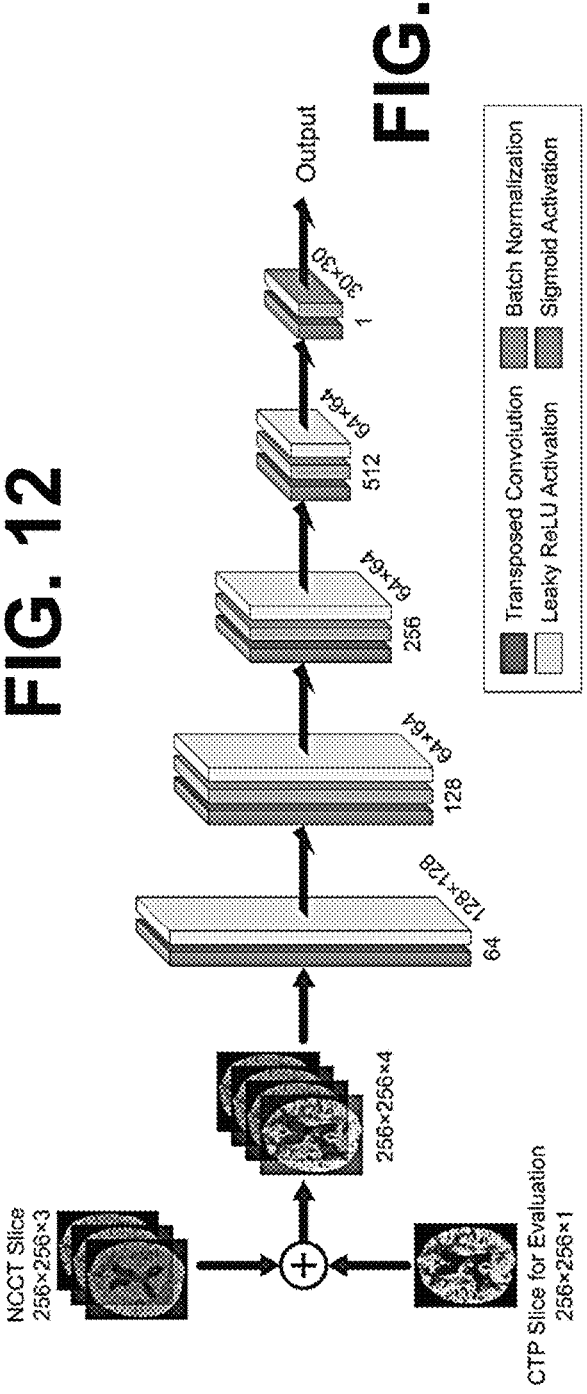
FIG. 13 is a schematic diagram illustrating an example of a discriminator network architecture, in accordance with various embodiments of the present disclosure.

Discriminator. The discriminator of Model MAGIC is made of a well-known CNN architecture known as Patch-GAN. Rather than conducting a pixel-wise evaluation of images as synthesized or real, PatchGAN attempts to classify patches of size [N×N] in each image as synthesized or real. For this task, PatchGAN was used with a receptive field size of, e.g., [70×70] to sufficiently evaluate the "realistic" quality of the synthesized images, meaning that PatchGAN will classify, e.g., [70×70] patches as synthesized or real. The input tensor for PatchGAN is a tensor (e.g., a [256×256×4] tensor) containing the input image concatenated with its corresponding label. For a synthesized image, the input can be concatenated with a matrix of zeros along the first dimension. Similarly, the input can be concatenated with a matrix of ones along the first dimension for a real image. PatchGAN can then generate a prediction on whether the input image is real, which is further used in constructing loss terms for MAGIC's generator and discriminator. The discriminator network's architecture is illustrated in FIG. 13, which provides a diagram of the discriminator network architecture. The discriminator applies a series of transposed convolution layers to the concatenated input of the NCCT slice and the CTP slice for evaluation.

Physiology-Inspired Loss Functions

GAN training typically represents a zero-sum game in which a generator network and a discriminator network can be updated dynamically to learn the mapping between multiple image domains. The generator learns to synthesize accurate CTP maps during this training process given an NCCT input, and the discriminator learns to distinguish the generator's output from the ground-truth data distribution. Additionally, we propose two novel loss terms, a multimodal loss, and an extrema loss. The multimodal loss term is inspired by the physiological relationship between CTP map classes. The extrema loss term encodes regions of tissue ischemia. Both work together to increase the accuracy of the synthesized maps.

Notations. A similar notation as has been previously used is adopted. The goal of the modal is to learn four mapping functions between the domain X of NCCT images and the domain of perfusion maps (CBV, CBF, MTT, and TTP). Given M training samples, each is composed of five elements: $\{x_i, cbv_i, cbf_i, mtt_i, ttp_i\}_i^M$ for the $i^{th}$ sample. Here $x_i \in X$ where X represents the set of NCCT images, $cbv_i \in CBV$, $cbf_i \in CBF$, $mtt_i \in MTT$, and $ttp_m \in TTP$. We will refer to the set containing all four perfusion maps as CTP={CBV, CBF, MTT, TTP}. Let N denote the cardinality of CTP which is 4 in our case but can be flexible depending on how many perfusion maps to predict for the generalizability of this method. Recalling that X contains the ground-truth NCCT, the input data distribution can be denoted as $x \sim P_{data}^{(x)}$ and will indicate the data distribution of the different perfusion maps as $cbv \sim P_{data}^{(cbv)}$, $cbf \sim P_{data}^{(cbf)}$, $mtt \sim P_{data}^{(mtt)}$, and $ttp \sim P_{data}^{(ttp)}$. The joint data distribution of an NCCT and its corresponding ground-truth perfusion map can be denoted as $(x, map) \sim (P_{data}^{(x)}, P_{data}^{(map)})$ where map can be replaced by any type from {cbv, cbf, mtt, ttp} depending on the perfusion map being discussed.

The model includes four mappings represented by four generators: $G_{CBV}$: X→CBV, $G_{CBF}$: X→CBF, $G_{MTT}$: X→MTT, and $G_{TTP}$: X→TTP. Moreover, the model has four discriminators $D_{CBV}$, $D_{CBF}$, $D_{MTT}$, and $D_{TTP}$ where each discriminator aims to distinguish between its corresponding ground-truth perfusion map and the synthetic perfusion map. Finally, Θ is used to represent element-wise multiplication and $W_x$ to represent a weighted matrix of a perfusion map of a given input x (ground-truth NCCT image). The weight matrices can be constructed by taking a ground-truth perfusion map image, normalizing the pixel values, and squaring so all pixel values are positive.

Physiology-Inspired Loss Functions.

Traditional generators in GANs utilize a sum of loss terms to evaluate 1) the similarity between the synthesized and the real images and 2) the generator's ability to "fool" the discriminator. Here, a modified objective function that mixes the traditional GAN objective with a structural fidelity loss term is used. The GAN term, as provided in equation (1), enables the adversarial nature of the Model MAGIC network, as $G_{CTP}$ aims to minimize the objective while $D_{CTP}$ aims to maximize it.

$$\mathcal{L}_{GAN}(G_{CTP}, D_{CTP}, CTP, X) = \frac{1}{N} \sum_{PM \in CTP} \mathbb{E}_{PM \sim p_{data}(PM)}[\log D_{PM}(PM)] + \mathbb{E}_{x \sim p_{data}(x)}[\log(1 - D_{PM}(G_{PM}(x)))] \quad (1)$$

$D_{CTP}$ is incentivized to correctly classify synthetic and real CTP maps, and $G_{CTP}$ is incentivized to produce outputs that fool the discriminator into incorrectly classifying synthetic CTP maps as real CTP maps. As an implementation detail, the weights of $D_{CTP}$ can be first optimized and frozen before optimizing the weights of $G_{CTP}$. The structural fidelity loss term, as provided in equation (2), is defined as the L1 distance between the generated map and the ground-truth map.

$$\mathcal{L}_{L1}(G_{CTP}, CTP, X) = \frac{1}{N} \sum_{PM \in CTP} \mathbb{E}_{(x, PM) \sim (p_{data}(x), p_{data}(PM))}[\|PM - G_{PM}(x)\|_1] \quad (2)$$

While the inclusion of this term does not affect the task of the discriminator, it ensures that the generator produces outputs that minimize the L1 distance between the generated and ground-truth CTP maps.

Two novel loss terms, multimodal loss and extrema loss, are proposed in Model MAGIC to leverage the physiological rules between CTP map types to further improve performance. Specifically, the multimodal loss leverages the Central Volume Principle, which describes the physiological relationship between the CBF, CBV, and MTT map classes. These map types are related by equation (3), which leads to the multimodal loss represented in equation (4).

$$CBV = CBF \times MTT \quad (3)$$

$$\mathcal{L}_{MML}(G_{CBF}, G_{MTT}, CBV, X) =$$

$$\mathbb{E}_{(x, CBV) \sim (Pdata(x), Pdata(CBV))}[\|G_{CBF}(x) \times G_{MTT}(x) - CBV\|_1] \quad (4)$$

The generator minimizes the L1 distance between the ground-truth CBV map and the product of the synthesized CBF and MTT maps, ensuring that the synthetic CTP maps are consistent with the central volume principle.

The extrema loss term enables increased fidelity in encoding regions-of-interest (ROI) in the simulated scans that differ significantly from the mean of the observed image. The extrema loss was introduced to ensure that Model MAGIC would accurately generate the ROIs with both very high and very low pixel intensities compared to the slice mean value. Its inclusion increases the likelihood that stroke regions in the synthesized perfusion imaging are properly identified and learned by Model MAGIC during training. Infarcted tissue regions tend to exhibit elevated MTT and TTP and decreased CBF and CBV, so these characteristics must be present in the synthetic CTP maps to ensure acceptable diagnostic quality. A weight map $W_x$ was generated by normalizing the ground truth perfusion map between [−0.5, 0.5] and then take an element-wise square of the normalized image, as shown in equation (5).

$$W_x = \left(\frac{PM - \min(PM)}{\max(PM) - \min(PM)} - 0.5\right)^2 \quad (5)$$

$W_x$ emphasizes the ROIs with values farther from the image mean. Then this weight map is multiplied by the MSE between the ground-truth and synthesized perfusion imaging, shown in equation (6).

$$H_x = \left(\frac{G_{PM}(x) - \min(G_{PM}(x))}{\max(G_{PM}(x)) - \min(G_{PM}(x))} - \frac{PM - \min(PM)}{\max(PM) - \min(PM)}\right)^2 \quad (6)$$

The mean of this product is taken to produce the final extrema loss term, as provided in equation (7).

$$\mathcal{L}_{EXT}(G_{CTP}, CTP, X) = \frac{1}{N} \sum_{PM \in CTP} \mathbb{E}_{(x, PM) \sim (p_{data}(x), p_{data}(PM))}[W_x \odot H_x] \quad (7)$$

Each additional loss term can be weighted with lambda tuning hyperparameters. The final objective to solve, which $G_{CTP}$ aims to minimize and $D_{CTP}$ aims to maximize, is shown below in equation (8).

$$G^* = \quad (8)$$

$$\arg \min_{G_{CTP}} \max_{D_{CTP}} \mathcal{L}_{GAN}(G_{CTP}, D_{CTP}, CTP, X) + \lambda_i \mathcal{L}_{L1}(G_{CTP}, CTP, X) +$$

$$\lambda_2 \mathcal{L}_{EXT}(G_{CTP}, CTP, X) + \lambda_3 \mathcal{L}_{MML}(G_{CBF}, G_{MTT}, CBV, X)$$

Figure 14:
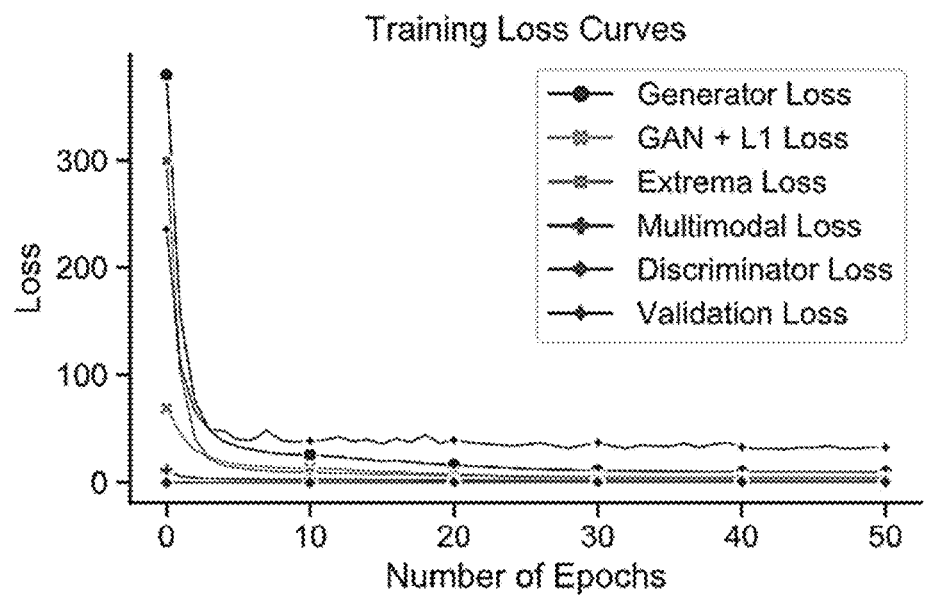
FIG. 14 illustrates an example of generator and discriminator losses during training, in accordance with various embodiments of the present disclosure.

Training Process. In Model MAGIC's training phase, each iteration follows a sequential process: 1) generate synthesized CTP maps for a given NCCT input using the multitask generators G, 2) compute the discriminator D's prediction on the real pair tensor and the fake pair tensor, 3) compute discriminator loss and update D's weights, and 4) compute generator loss and update G's weights. These steps are repeated until the convergence of the generator and discriminator loss terms. The values of these loss terms throughout training are shown in FIG. 14, which illustrates generator, discriminator, and validation losses during the training process. The training was stopped once convergence of both the discriminator and generator loss terms was observed. The validation loss was calculated on a set of 10 randomly selected patients from the test set to ensure the model was not overfitting the training set. For final visualization, the perfusion information ratio in the PILO module can be scaled to select the optimal contribution from anatomical and hemodynamic imaging.

Network Training. The sizes of the input NCCT images and each output CTP image were [256×256×3] and [256×256×1], respectively. A colormap can be applied to the generated grayscale CTP images to visualize results easily. A convolving kernel of size [4×4] was used for each encoding layer. A convolution stride of size 2 and a zero-padding of size 1 is used. Model MAGIC was implemented using the PyTorch version 1.5.0 library in Python version 3.6.10 and the NVIDIA CUDA platform version 7.6.5 to enable GPU accelerated computation. Model MAGIC was trained for 50 epochs on an NVIDIA TITAN X GPU with a GPU RAM of 7000 MB. Adam optimizer with β values of $\beta_1 = 0.5$ and $\beta_2 = 0.999$ were used.[41] After 50 epochs of training, performance was not found to improve further. A batch size of 8 was used, and the learning rates for the generator and discriminator are set to a constant value of $1e^{-4}$. A learning rate decay was not found to improve the quality of results. After each epoch, the generator loss was computed and recorded on a validation set of 100 randomly selected sample images to ensure that the MAGIC model was not overfitting the training set. In total, model training spanned roughly 25 hours.

Evaluation. The evaluation of Model MAGIC's performance included two primary components to assess the overall quality and clinical applicability of the synthesized CTP series: 1) quantitative image evaluation and 2) expert visual assessment. The primary image quality metrics used to define Model MAGIC's performance in synthesizing high-quality CTP series are structural similarity index metric (SSIM) and universal quality index (UQI). SSIM is a full-reference metric that assesses the image quality via the perceived changes in structural information, characterized by luminance, contrast, and structure. UQI captures the quality of an image compared to a reference image by assessing distortion of correlation, luminance, and contrast. SSIM and UQI are preferred metrics for assessing the clinical viability of the synthetic perfusion imaging results as they provide a full-reference measure of perceptual image quality based on factors like local structure, contrast, and luminance.

Metrics of the absolute difference between a target and reference sample can be confounded by slight patient movements between the collection of the NCCT and CTP series, and these metrics are thus inappropriate measures of the quality of the results. Rather than measuring the absolute or relative pixel-wise intensity difference, SSIM and UQI provide a measure of clinical viability of the synthetic perfusion imaging, as a higher perceptual score between the synthetic and reference perfusion imaging indicates that the synthetic imaging should produce similar diagnostic outcomes when evaluated by a physician. SSIM and UQI are defined in equations (9) and (10), respectively.

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)} \quad (9)$$

$$UQI(x, y) = \frac{4\sigma_{xy}\bar{x}\bar{y}}{(\sigma_x^2 + \sigma_y^2)[(\bar{x})^2 + (\bar{y})^2]} \quad (10)$$

Figure 15:
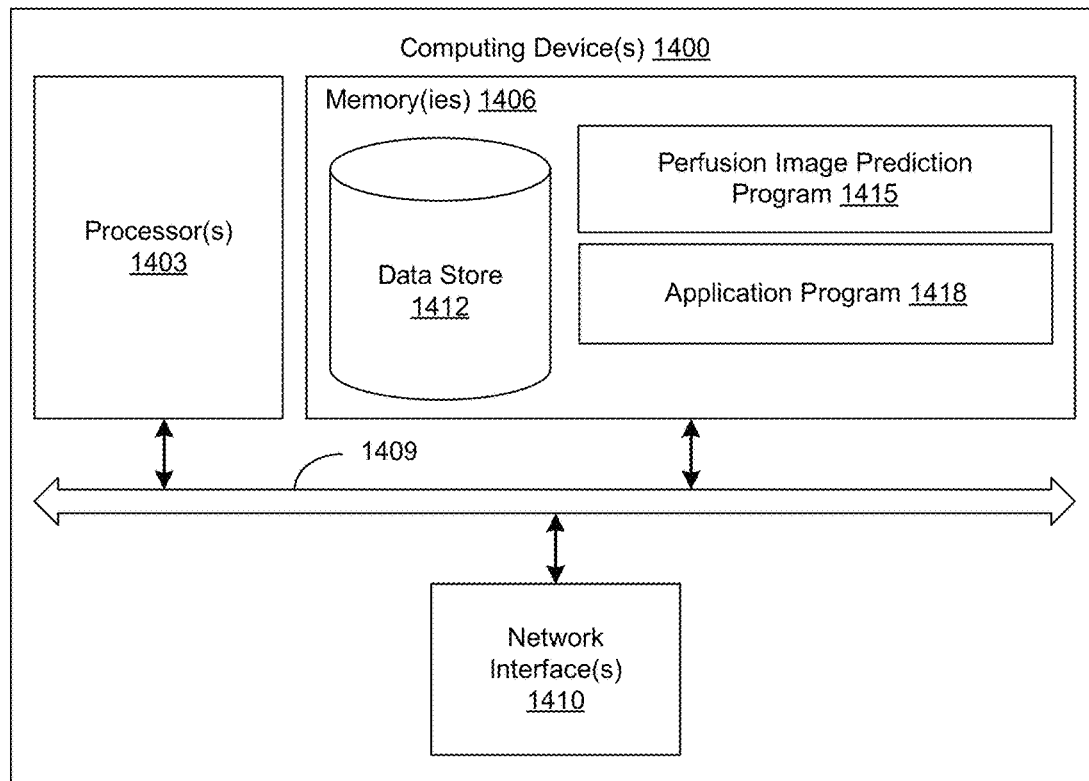
FIG. 15 is a schematic block diagram of an example of a computing device that can be utilized for dynamic brain parcellation, in accordance with various embodiments of the present disclosure.

System Implementation. With reference to FIG. 15, shown is a schematic block diagram of a computing device 1400 that can be utilized for predicting perfusion images from non-contrast scans. In some embodiments, among others, the computing device 1400 may represent a mobile device (e.g., a smartphone, tablet, computer, etc.). Each computing device 1400 includes at least one processor circuit, for example, having a processor 1403 and a memory 1406, both of which are coupled to a local interface 1409. To this end, each computing device 1400 may comprise, for example, at least one server computer or like device. The local interface 1409 may comprise, for example, a data bus with an accompanying address/control bus or other bus structure as can be appreciated. The computing device 1400 can be communicatively coupled to one or more display devices configured to display information rendered by the computing device.

In some embodiments, the computing device 1400 can include one or more network interfaces 1410. The network interface 1410 may comprise, for example, a wireless transmitter, a wireless transceiver, and a wireless receiver. As discussed above, the network interface 1410 can communicate to a remote computing device using a Bluetooth protocol. As one skilled in the art can appreciate, other wireless protocols may be used in the various embodiments of the present disclosure. For example, the computing device 1400 can communicate information to a user device for display through a user interface. The information can be rendered by the computing device 1400 or by the user device for display.

Stored in the memory 1406 are both data and several components that are executable by the processor 1403. In particular, stored in the memory 1406 and executable by the processor 1403 are a perfusion image prediction program 1415, application program 1418, and potentially other applications. Also stored in the memory 1406 may be a data store 1412 and other data. In addition, an operating system may be stored in the memory 1406 and executable by the processor 1403.

It is understood that there may be other applications that are stored in the memory 1406 and are executable by the processor 1403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access code portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and/or multiple processor cores and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the perfusion image prediction program 1415 and the application program 1418, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the perfusion image prediction program 1415 and the application program 1418, that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the perfusion image prediction program 1415 and the application program 1418, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1400, or in multiple computing devices in the same computing environment. Additionally, it is understood that terms such as "application," "service," "system," "engine," "module," and so on may be interchangeable and are not intended to be limiting.

Infarct Core to Ischemic Penumbra Ratio

The ratio of infarct core to ischemic penumbra was determined using the CBF/Mismatch analysis in the RAPID data. The CBF/Mismatch shows the regions where CBF is less than 30% and where TTP is greater than 6 seconds. Studies have shown that these are accurate surrogate regions for the infarct core and ischemic penumbra regions, which we use as surrogates for the infarct core and ischemic penumbra regions below.

Given the CBF/Mismatch for a patient, the ratio of infarct core and ischemic penumbra was defined as the ratio of the infarct core volume to ischemic penumbra volume. The volume of the infarct core was calculated by summing the number of pixels of reduced CBF for all z-slices in the CBF/Mismatch analysis. The volume of the ischemic penumbra was analogously calculated by summing over the delayed TTP volumes. The infarction classes were determined with these ratios. The class of mild infarction represents the volume ratio of 0-0.20, moderate infarction is 0.20-0.50, and severely infarcted is greater than 0.50.

Double-Blind Clinical Evaluation

Twenty subjects from the test data were used to conduct the experiments. Among them, 7 were non-infarcted healthy subjects, 3 exhibited mild infarction, 9 exhibited moderate infarcted tissue, and 1 exhibited severely infarcted tissue. These stratifications were determined using region of interest (ROI) data from RAPID. The experiment was split into two trials to prevent bias due to reviewing both the RAPID and MAGIC-generated perfusion maps. Each trial consisted of 20 sets of four perfusion maps (CBV, CBF, MTT, and TTP), where each set was a randomly selected real or synthetic perfusion series of one subject among the 20 subjects. The real and synthetic sets of perfusion maps of the same subject were placed in different trials.

Figure 16A:
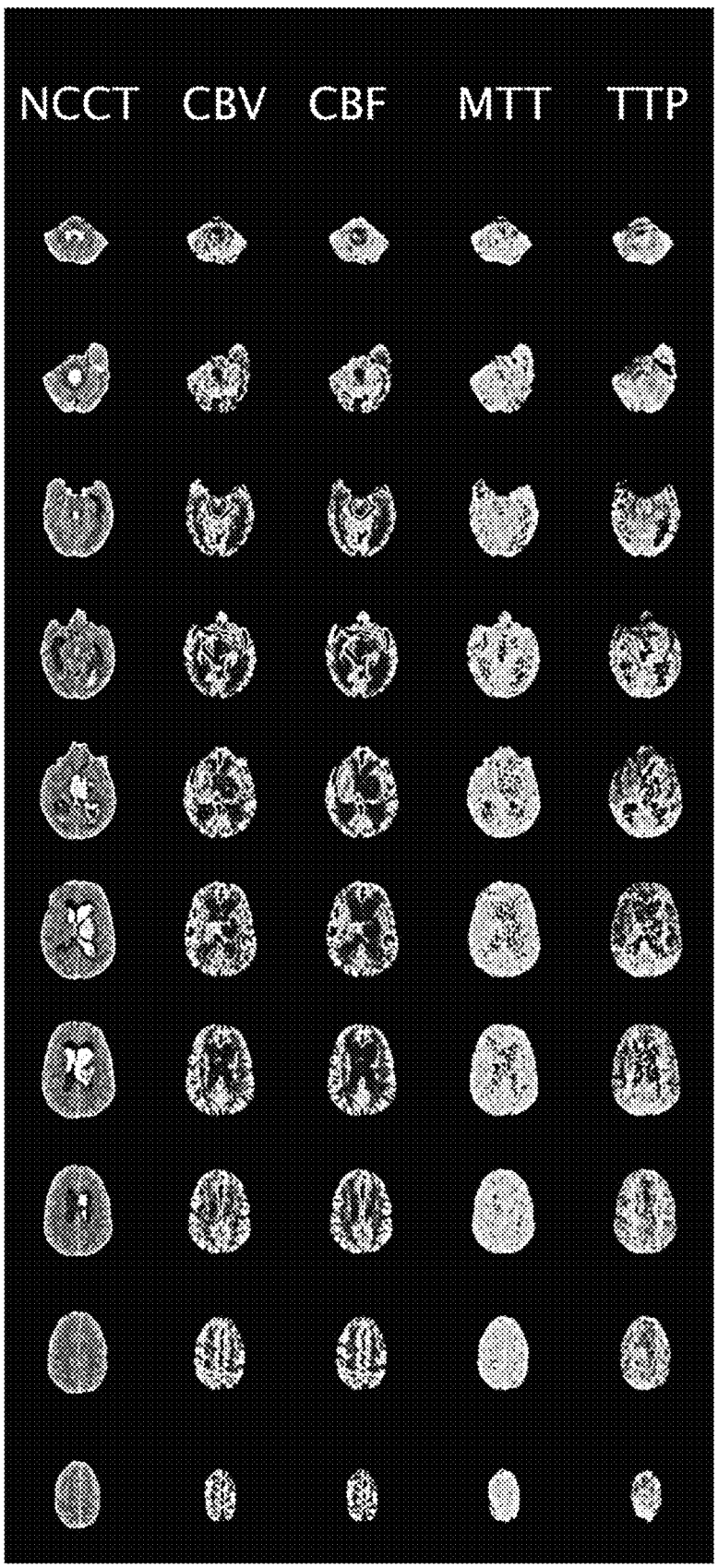
Figure 16B:
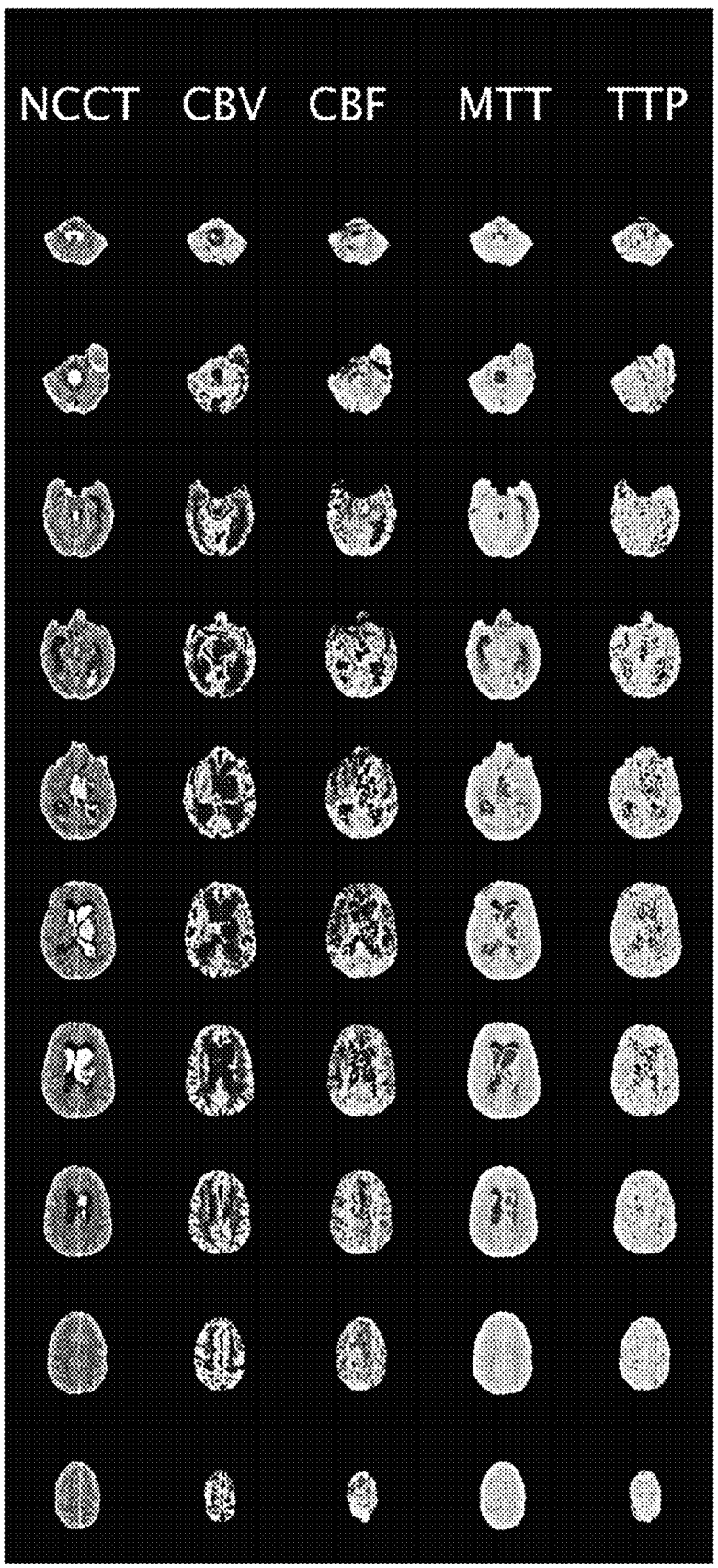

Furthermore, the patients were randomly shuffled and renamed using pseudo-IDs for anonymization within each trial. The shuffle was done so that the real and synthetic sets of perfusion maps from the same subjects did not necessarily have the same indices in both trials. Each subject's NCCT and CTP images were provided in one montage view, where five columns represented the NCCT image, CBV, CBF, MTT, and TTP maps, and the rows were the slices from different axial axis locations. FIGS. 16A and 16B show examples of sample CTP maps column view given to radiologists for clinical evaluation of a subject with moderate infarction. The image of FIG. 16A is the real CTP maps, and the image of FIG. 16B is the synthetic CTP maps for the same subject.

Three radiologists (D.R., J.R., P.S. with 20, 31, and 27 years of experience, including radiology training, respectively) from UF Health, Weill Cornell Medical College, and Northwell Health independently reviewed each set of images from two trials with an interval of 5 weeks between the trials to avoid confirmation bias. The radiologists were asked to answer a series of questions on a questionnaire. The questionnaire was designed in consultation with the three radiologists to assess four objectives on the diagnostic quality of perfusion maps generated by the Model MAGIC: (1) are the maps physiologically consistent; (2) are the maps diagnostically acceptable; (3) are the diagnosis consistent between the synthetic CTP images and the real CTP images; and (4) how confident are the raters in the given diagnosis to assess diagnostic confidence. The questionnaire provided to evaluators included the following questions:

Q1. Do you think this is a real CT perfusion map?
  1. Yes
  0. No

Q2. For the following questions A-D, make your best efforts to choose "Acceptable" or "Unacceptable." If you choose "Indeterminate," please provide a short explanation of your answer.
  a. What is the diagnostic quality of the CBV maps?
    1. Acceptable
    0. Indeterminate
    −1. Unacceptable
  b. What is the diagnostic quality of the CBF maps?
    1. Acceptable
    0. Indeterminate
    −1. Unacceptable
  c. What is the diagnostic quality of the MTT maps?
    1. Acceptable
    0. Indeterminate
    −1. Unacceptable
  d. What is the diagnostic quality of the TTP maps?
    1. Acceptable
    0. Indeterminate
    −1. Unacceptable Q3. What diagnosis would be given to this patient based on their NCCT and CTP imaging?
  1. Normal exam with no perfusion deficit
  2. Core infarct is less than or equal to 20% of the tissue at risk
  3. Core infarct is strictly more than 20% of the tissue at risk
  4. Core infarct is approximately equal to tissue at risk
Q4. Rate your confidence in the above diagnosis.
  1. Not confident
  2. Slightly confident
  3. Somewhat confident
  4. Fairly confident
  5. Completely confident Cosine similarity statistics among the three radiologists on the questionnaire showed the average inter-rater similarity between pairwise radiologists in the range [0.5931, 0.8371]. The table of FIG. 17A illustrates cosine similarity statistics for questions 1-4 among the three readers for real CTP responses. The results indicate an average inter-reader similarity in the range of [0.6494,0.8168]. Cosine similarity has a range between −1 and 1 and yields 1 if the responses among doctors are the same. Hence, the average inter-reader similarity indicates good to excellent reliability. The table of FIG. 17B illustrates cosine similarity statistics for Questions 1-4 among the three readers for Synthetic CTP responses. The results indicate an average inter-reader similarity in the range of [0.5931,0.8371]. The average inter-reader similarity indicates good to excellent reliability.

Significance Test for Overall Comparison

As this work represents the first-of-its-kind deep learning approach to generate non-contrast CT perfusion maps from NCCT alone, the clinical evaluation focused on demonstrating that the perfusion maps generated using Model MAGIC from NCCT scans were diagnostically comparable to those produced by RAPID from contrast-enhanced CTP imaging data. Henceforth, we consider the following hypothesis test:

MAGIC=RAPID: there is no significant difference between the perfusion maps generated by MAGIC and RAPID in terms of diagnostic quality.

The statistical test used was 2-sample equality of proportions test with continuity correction and difference of means in the R programming language. Because the goal is to show no significant difference between the perfusion maps generated using MAGIC and RAPID commercial software, as represented by the null hypothesis, it would fail to reject the null hypothesis only if the associated p-value>0.05. The null and alternative hypotheses are given below in equation (11).

$$H_0: MAGIC=RAPID \quad H_A: MAGIC \neq RAPID \quad (11)$$

A difference in proportions test was used to analyze questions 1 and 2A-2D. For question 1, the hypothesis was created based on the counts of real and synthetic responses for the MAGIC and RAPID data. For questions 2A-2D, the hypothesis was created based on the counts of acceptable, indeterminant, and unacceptable responses for the MAGIC and RAPID generated maps. A difference in means was used for the analysis of question 4 and was based on the weighted average of the responses in each confidence category (e.g., Not confident is weighted by 1, Slightly Confident weighted by 2, Somewhat Confident weighted by 3, Fairly Confident weighted by 4, and Completely Confident weighted by 5). The p-values associated with all the statistical tests can be found in FIGS. 8 and 9. Since question 3 evaluates the consistency of diagnosis between the real and synthetic perfusion maps, the response rates were reported, and no statistical test was conducted.

Discussion

The proposed Model MAGIC, including the novel physiology-informed loss terms and physicians-in-the-loop module, performs favorably in comparison to commercial software for perfusion imaging with contrast. Model MAGIC enables rapid, contrast-free, high fidelity, high resolution, and physician-preferred generation of CTP imaging from only NCCT series. By implementing this model in clinical practice, the need for contrast injection may be reduced to produce diagnostically equivalent perfusion imaging, reducing acquisition time (roughly 90 seconds or more using contrast-enhanced CTP to roughly 1.5 seconds using NCCT only), forgoing the length of preparation time for contrast injection, improving scan-to-map post-processing speed (roughly 5 minutes using RAPID software to about 7.43 sec per volume of 161 slices once trained) and cost-effectiveness at which physicians can assess a patient's hemodynamic activity, and saving critical time at rapid triage stage.

This can further be used to enable CTP imaging in limited-resource hospitals that currently lack the proper training, staff, contrast agent, funds, or facilities to conduct CTP protocols. Additionally, the use of non-contrast imaging in synthesizing perfusion data via Model MAGIC offers benefits in reducing the radiation dose of routine imaging procedures. The radiation output of a head CTP exam is roughly 4 to 10 times that of a head NCCT exam (200 to 500 mGy in CTP vs. 50 to 70 mGy in NCCT), and prior studies have raised the concern of patient harm from radiation exposure during CTP, especially within the context of multimodal CT protocol. The use of non-contrast imaging in the synthesis of CTP imaging can also circumvent potential negative side effects associated with iodinated contrast injection, including allergic reactions, cardiac and renal failure, and pulmonary edema. These improvements to the safety, efficiency, and accessibility of CTP imaging, as well as the significant reduction in supply cost through the elimination of intravenous contrast injection, position Model MAGIC as a valuable asset in enabling contrast-free perfusion imaging.

This disclosure is the first to address the research question and clinical potential of a contrast-free generation of CTP imaging using image-to-image translation techniques between NCCT and CTP series. Significant technical and clinical innovations are introduced into this physiology-informed multitask deep learning model. The novel physicians-in-the-loop (PILO) module provides radiologists with an interactive and adaptive diagnostic tool to select and visualize the hemodynamic activity embedded in anatomical imaging. The radiologist evaluators indicated that PILO is a valuable tool that allowed for better visualization and diagnosis of the brain's perfusion activity than the clinical perfusion scans alone.

The evaluation demonstrates that Model MAGIC can utilize deep learning-based multimodal image translation techniques to synthesize non-contrast perfusion maps with comparable structural fidelity and diagnostic quality to real perfusion imaging generated using commercial software. Perfusion maps generated by Model MAGIC, especially CBF and CBV maps, display accurate hemodynamic status present in ground-truth imaging. There was no significant difference in the values of the image metrics across all four image map classes, indicating that the Model MAGIC performs stably across perfusion map types. There was no significant difference between the performance metrics across different patients with varying levels of infarction status, indicating that Model MAGIC is robust to abnormal hemodynamic activities such as acute ischemia.

The double-blinded diagnostic evaluation indicated that our synthetic perfusion imaging accurately portrays ground-truth imaging and has no distinguishable features that the radiologists could use to consistently discriminate between synthesized and ground-truth imaging. The radiologist evaluators in this study concluded that the synthetic imaging was of sufficient diagnostic quality to confidently diagnose a patient and generate a treatment plan. In concurrent discussions with the radiologists, it was found that they prefer to use CBV and TTP imaging to produce a diagnostic decision and characterize the volumes of the infarcted core and the ischemic penumbra. It was found that the diagnoses and treatment plan the radiologists produced using the synthesized imaging were statistically consistent with those they gave to the corresponding real perfusion imaging.

The diagnostic accuracy and computational efficiency offered by Model MAGIC potentiates more rapid and cost-efficient clinical workflows in assessing neurovascular health and treating acute ischemia. Since non-contrast CTP synthesis via deep learning image translation is a novel research problem, there are no baseline approaches for comparison of the results. Additionally, it was found that the MTT imaging produced by the RAPID software was consistently ranked as "unacceptable" when evaluated by radiologists. The RAPID data have limitations that account for its current limited use in the clinical setting. Even though MAGIC performs well in predicting hemodynamic activity from non-contrast imaging, capturing a complete representation of microvascular activity consistently is difficult. For example, prediction of small-vessel occlusions based on non-contrast imaging alone is limited. This may be addressed by incorporating more detailed perfusion imaging data from other cohorts into the training set. The issues present with capturing the activity from temporal perfusion maps—TTP and MTT—may also be addressed. A more accurate encoding of the temporal map classes can enable radiologists to make a more informed diagnosis. Finally, registration of NCCT and CTP slices in the training or test can be improved to provide paired, co-registered data between the NCCT and CTP imaging series. Since the axial CTP image slices are sparser in spatial density than the axial NCCT image slices, considering the NCCT image slices with a corresponding CTP slice at the exact vertical location may be limited. As a result, incorporation of a more complete dataset into the training algorithm can improve the use of the information from all slices in NCCT. Even with reduced training data size, Model MAGIC is capable to learn the mapping between NCCT and CTP well and generalize to new data.

The Model MAGIC exhibits impressive performance in capturing and characterizing the brain's hemodynamic activity in various cases based solely on non-contrast, structural imaging. The algorithm could be trained to generate perfusion maps in collaboration with specific vendors and perfusion software to meet the needs of diagnosis using perfusion imaging in particular organs and diseases. Additionally, Model MAGIC may be implemented in a clinical setting to efficiently generate perfusion imaging for rapid assessment of patient neurovascular health. There is a trend of rapid stroke diagnosis based on non-contrast imaging alone, and our Model MAGIC will empower the development of a rapid computer-aided diagnostic system that can recommend treatment protocols for patients based on non-contrast CT imaging alone.

In conclusion, the proposed Model MAGIC can generate contrast-free brain perfusion imaging from solely non-contrast, structural imaging that exhibits comparable analytical and diagnostic results to the ground-truth perfusion imaging. As a result, this model's implementation can expand the accessibility of CTP brain imaging while reducing the time, cost, and patient risk associated with these diagnostic protocols.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for predicting perfusion images, comprising:
generating perfusion maps of an organ of a subject from a plurality of non-contrast computed tomography (NCCT) slices of the organ;
processing the perfusion maps based upon weights determined by a Physicians-in-the-Loop (PILO) module; and
generating synthetic computed tomography perfusion (CTP) maps from the processed perfusion maps, the synthetic CTP maps generated by deep learning-based multimodal image translation.

2. The method of claim 1, wherein the perfusion maps include cerebral blood flow (CBF), cerebral blood volume (CBV), mean transit time (MTT), time to peak perfusion (TTP), or a combination thereof.

3. The method of claim 1, wherein the perfusion maps are generated using multitask perfusion map generation.

4. The method of claim 3, wherein initial encoding layers share encoded weights of the perfusion maps before the multitask perfusion map generation.

5. The method of claim 3, wherein the multitask perfusion map generation is based at least in part upon multimodal loss and extrema loss.

6. The method of claim 1, wherein the weights of the PILO module are based at least in part upon evaluation by a reviewing physician.

7. The method of claim 1, wherein the organ is a brain.

8. A system, comprising:
   at least one computing device comprising processing circuitry including a processor and memory, the at least one computing device configured to at least:
   generate perfusion maps of an organ of a subject from a plurality of non-contrast computed tomography (NCCT) slices of the organ;
   process the perfusion maps based upon weights determined by a Physicians-in-the-Loop (PILO) module; and
   generate synthetic computed tomography perfusion (CTP) maps from the processed perfusion maps, the synthetic CTP maps generated by deep learning-based multimodal image translation.

9. The system of claim 8, wherein the perfusion maps include cerebral blood flow (CBF), cerebral blood volume (CBV), mean transit time (MTT), time to peak perfusion (TTP), or a combination thereof.

10. The system of claim 8, wherein the at least one computing device generates the perfusion maps using multitask perfusion map generation.

11. The system of claim 10, wherein initial encoding layers share encoded weights of the perfusion maps before the multitask perfusion map generation.

12. The system of claim 10, wherein generation of the multitask perfusion map is based at least in part upon multimodal loss and extrema loss.

13. The system of claim 8, wherein the weights of the PILO module are based at least in part upon evaluation by a reviewing physician.

14. The system of claim 8, wherein the synthetic CTP maps are rendered for display to a user.

15. The system of claim 14, wherein at least a portion of the synthetic CTP maps are rendered on a display device in communication with the at least one computing device.

16. The system of claim 14, wherein at least a portion of the synthetic CTP maps are communicated to a user device by the at least one computing device for display.

17. The system of claim 8, wherein the organ is a brain.

* * * * *